(12) United States Patent
Kosaka et al.

(10) Patent No.: US 7,703,281 B2
(45) Date of Patent: Apr. 27, 2010

(54) MOTOR, MOTOR DEVICE, AND LENS DRIVE MECHANISM USING THE SAME

(75) Inventors: Akira Kosaka, Yao (JP); Junichi Tanii, Izumi (JP); Yoshie Shimizu, Ibaraki (JP); Shigeru Wada, Kishiwada (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1030 days.

(21) Appl. No.: 11/415,741

(22) Filed: May 2, 2006

(65) Prior Publication Data

US 2006/0266031 A1    Nov. 30, 2006

(30) Foreign Application Priority Data

May 27, 2005   (JP)   ............................. 2005-155498
Feb. 2, 2006   (JP)   ............................. 2006-025885

(51) Int. Cl.
*F01B 29/10*   (2006.01)

(52) U.S. Cl. ............................ 60/529; 60/528; 310/306

(58) Field of Classification Search ........... 60/527–529; 310/306–309
See application file for complete search history.

(56) References Cited

U.S. PATENT DOCUMENTS

| | | | | | |
|---|---|---|---|---|---|
| 4,037,411 | A | * | 7/1977 | Hochstein | .................... 60/527 |
| 4,087,971 | A | * | 5/1978 | Hart | ............................. 60/527 |
| 5,068,565 | A | * | 11/1991 | Huang | ......................... 310/328 |
| 6,155,220 | A | * | 12/2000 | Marriott | .................. 123/90.17 |
| 6,242,841 | B1 | * | 6/2001 | Williams | ..................... 310/306 |
| 7,076,951 | B2 | * | 7/2006 | Zanella et al. | ................. 60/527 |

FOREIGN PATENT DOCUMENTS

JP         07-327280 A    12/1995

* cited by examiner

*Primary Examiner*—Hoang M Nguyen
(74) *Attorney, Agent, or Firm*—Sidley Austin LLP

(57) ABSTRACT

An arrangement of the invention includes a base block 16, a cylindrical cam 14, as a rotary member, which is rotatably supported on the base block 16, and includes a contact portion on an outer periphery thereof for outputting a rotating force, a drive gear 21, as an oscillatory ring, which includes a contact portion on an inner periphery thereof, and is oscillated on a plane perpendicular to a rotation axis of the cylindrical cam 14 in contact with the contact portion of the cylindrical cam 14, parallel springs 23 through 26, as a position retainer, for retaining the position of the drive gear 21, and three or more shape metal alloy actuators (SMA) wires 35 through 38, as expandable and contractible actuators, with both ends of the each SMA wire being fixed to the base block 16 for contact with the drive gear 21.

18 Claims, 14 Drawing Sheets

ENERGIZATION CONTROL
IN LOW TEMPERATURE CONDITION

MOTOR, MOTOR DEVICE, AND LENS DRIVE MECHANISM USING THE SAME

This application is based on Japanese Patent Application No. 2005-155498 and No. 2006-25885 filed on May 27, 2005, and Feb. 2, 2006, respectively, the contents of which are hereby incorporated by reference.

BACKGROUND OF THE INVENTION

1. Field of the Invention

The present invention relates to a motor for generating a rotation driving force using a shape memory alloy, a motor device, and a lens drive mechanism incorporated with the motor for use in an image sensing apparatus.

2. Description of the Related Art

The shape memory alloy (SMA) is generally used for an actuator which is actuated in response to a change of ambient temperature. For instance, the SMA is used for a valve portion to regulate the temperature of hot water in a hot water system, or for the purpose of varying a ventilating opening in accordance with a temperature change of external air. In the above usage, it is often the case that the SMA is molded into a coil spring, which is used in combination with a rectilinear reciprocating mechanism.

Japanese Unexamined Patent Publication No. 7-327380 discloses an SMA actuator which is designed to generate heat with its own Joule heat by energization thereto for actuation. As an example of the SMA actuator, there is disclosed an electric motor incorporated with rotary actuators, wherein the linear type SMA actuators are provided. Specifically, the electric motor adopts a crank mechanism, in which one ends of the substantially U-shaped SMA actuators are circumferentially and equidistantly supported on a disk-like base block, and the other ends thereof are circumferentially and equidistantly supported on a rotary drive member, which is rotatably mounted on a rotor at an eccentric position of the rotor. As the SMA actuators are sequentially expanded and contracted, the distance between the other end of the corresponding SMA actuator, and the rotary drive member is varied, thereby rotating the rotor.

In the above conventional crank mechanism, a displacement amount of each SMA actuator is significantly small, and a sufficient pivotal rotation of the rotor is difficult by the mechanism having the small number of SMA actuators as proposed in the conventional arrangement. Also, if the number of the SMA actuators is decreased, the crank diameter of the crank mechanism is decreased, which means generation of a small torque. The increased number of the SMA actuators leads to generation of a large torque, however, it may lower the rotation number of the rotor, make the assembling of the crank mechanism complicated, and raise the production cost. Increasing the axis diameter of the SMA actuator may avoid complex assembling of the mechanism to some extent. However, a required response time may be unduly extended in view of a relation between the volume and the surface area of the SMA actuators, with the result that the rotating speed of the rotor may be lowered, as compared with a case where an increased number of SMA actuators is used. Also, increasing the length of the SMA actuator may increase the size of the actuator itself.

In the electric motor employing the rotary actuators, a crank rod is provided at a center of rotation of the rotor. Accordingly, it is impossible to arrange the electric motor coaxially with a lens optical system, considering driving of the lens optical system, and it is necessary to dispose the electric motor on the side of a lens barrel, for instance. This may lead to increase the size of an image sensing apparatus incorporated with the electric motor.

SUMMARY OF THE INVENTION

In view of the above problems residing in the prior art, it is an object of the present invention to provide an SMA-based quiet and compact motor that enables to generate a large rotation driving force, and be assembled into a cylindrical configuration so as to drive a lens element substantially coaxially with an optical system, as well as a motor device, and a lens drive mechanism incorporated with the motor.

According to an aspect of the invention, a motor comprises: a base block; a rotary member which is rotatably supported on the base block, and includes a contact portion on an outer periphery thereof for outputting a rotating force; an oscillatory ring which includes a contact portion on an inner periphery thereof, and is oscillated on a plane perpendicular to a rotation axis of the rotary member in contact with the contact portion of the rotary member; a position retainer for retaining a position of the oscillatory ring; and three or more expandable and contractible actuators each in the form of a wire or a belt, the each actuator having both ends thereof being fixed to the base block for contact with the oscillatory ring.

These and other objects, features and advantages of the present invention will become more apparent upon reading of the following detailed description along with the accompanying drawings.

DETAILED DESCRIPTION OF THE PREFERRED EMBODIMENTS

Figure 1:
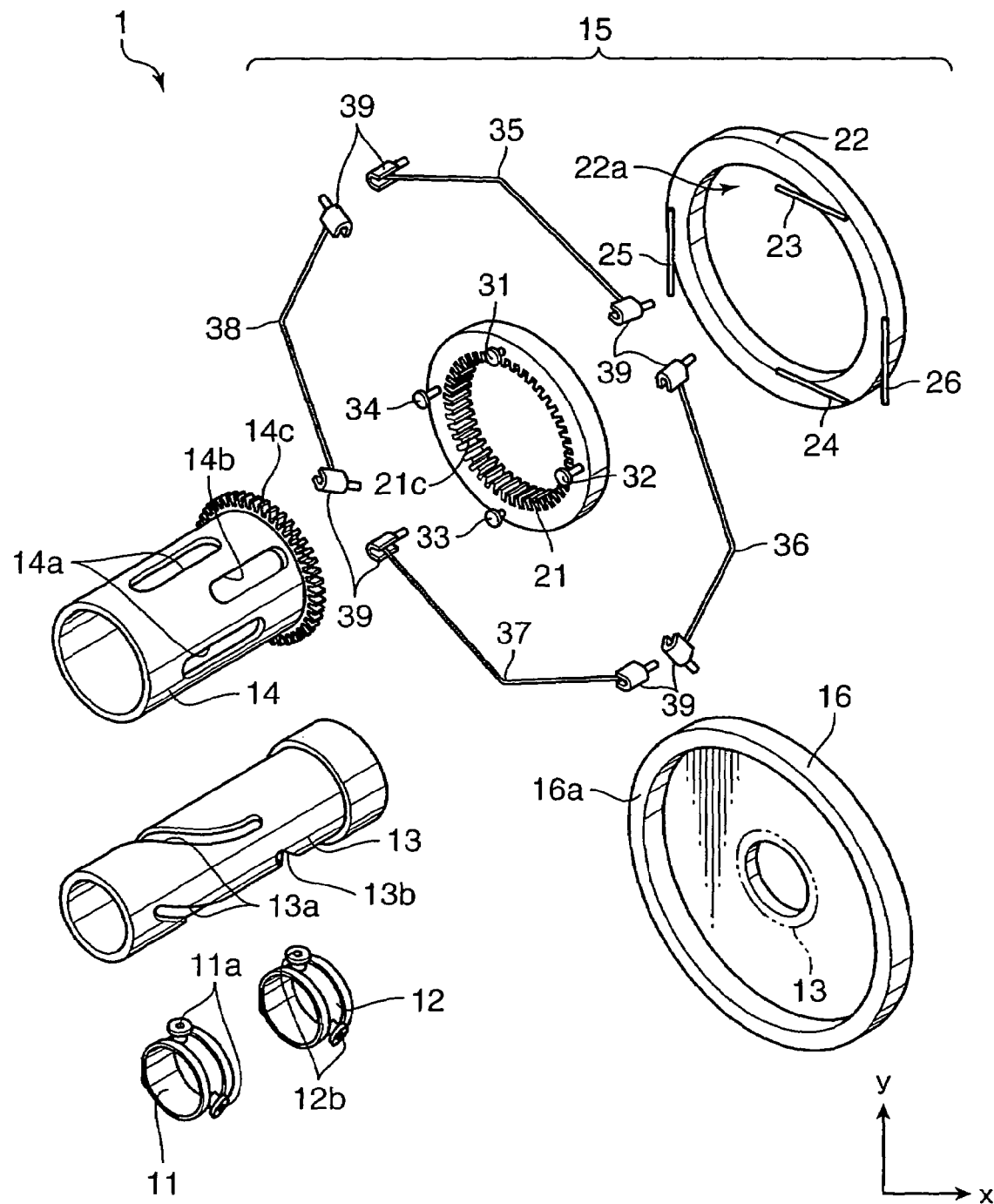
FIG. 1 is a perspective view showing a construction of a zoom unit for use in an image sensing apparatus, serving as a lens drive mechanism in accordance with a first embodiment of the invention.

In the following, embodiments of the invention are described referring to the drawings.

First Embodiment

FIG. 1 is a perspective view showing a construction of a zoom unit for use in an image sensing apparatus, which serves as a lens drive mechanism in accordance with a first embodiment of the invention. The zoom unit 1 includes ring frames 11, 12 for supporting an unillustrated lens element on respective inner surfaces thereof, a fixed cylinder 13, a cylindrical cam 14, and a driver assembly 15. The zoom unit 1 is mounted on a base block 16.

The ring frames 11 and 12 has three projections 11a and 12b, respectively. The ring frames 11 and 12 are accommodated in the fixed cylinder 13 and the cylindrical cam 14 in this order in such a manner that the projections 11a of the ring frame 11 are received in a through groove 13a of the fixed cylinder 13 and in corresponding through grooves 14a of the cylindrical cam 14, and the projections 12b of the ring frame 12 are received in a through groove 13b of the fixed cylinder 13 and in corresponding through grooves 14b of the cylindrical cam 14. The fixed cylinder 13 is fixed to the base block 16. The through grooves 13a and 13b of the fixed cylinder 13 each has such a configuration that its axial displacement is converted into a circumferential rotation thereof. On the other hand, the through grooves 14a, 14b of the cylindrical cam 14 extend in an axial direction of the cylindrical cam 14. As will be described later, in response to rotational driving of the cylindrical cam 14, each of the projections 11a of the ring frame 11 is moved along an intersection of the corresponding through groove 14a of the cylindrical cam 14 and the through groove 13a of the fixed cylinder 13, and each of the projections 12a of the ring frame 12 is moved along an intersection of the corresponding through groove 14b of the cylindrical cam 14 and the through groove 13b of the fixed cylinder 13. Thereby, the distance between the ring frames 11 and 12 is varied to thereby adjust the focal length of an optical system.

The cylindrical cam 14, as a rotary cylinder and an output rotary member, is rotatably supported on the base block 16. Teeth 14c as a contact portion are formed along an outer circumference of a base end of the cylindrical cam 14. A part of the teeth 14c is allowed to be meshed with a part of teeth 21c, which serve as a contact portion. The teeth 21c is formed along an inner circumference of a drive gear 21, which serves as an oscillatory ring or an oscillatory member of the driver assembly 15. The drive gear 21 is mounted on the base block 16, and is housed in an annular intermediate frame 22 having an inner diameter larger than an outer diameter of the drive gear 21 in such a manner that the drive gear 21 is allowed to be movable solely in y-direction i.e. vertical directions on the plane of FIG. 1 within an accommodating space 22a defined in the intermediate frame 22 by a pair of parallel springs 23 and 24. The intermediate frame 22 is supported on an annular wall of the base block 16, and is allowed to be movable solely in x-direction i.e. transverse directions on the plane of FIG. 1 by a pair of parallel springs 25 and 26. Thus, the drive gear 21 is oscillatory supported on the base block 16, with its rotation being restrained, namely, the position thereof being retained.

Figure 2:
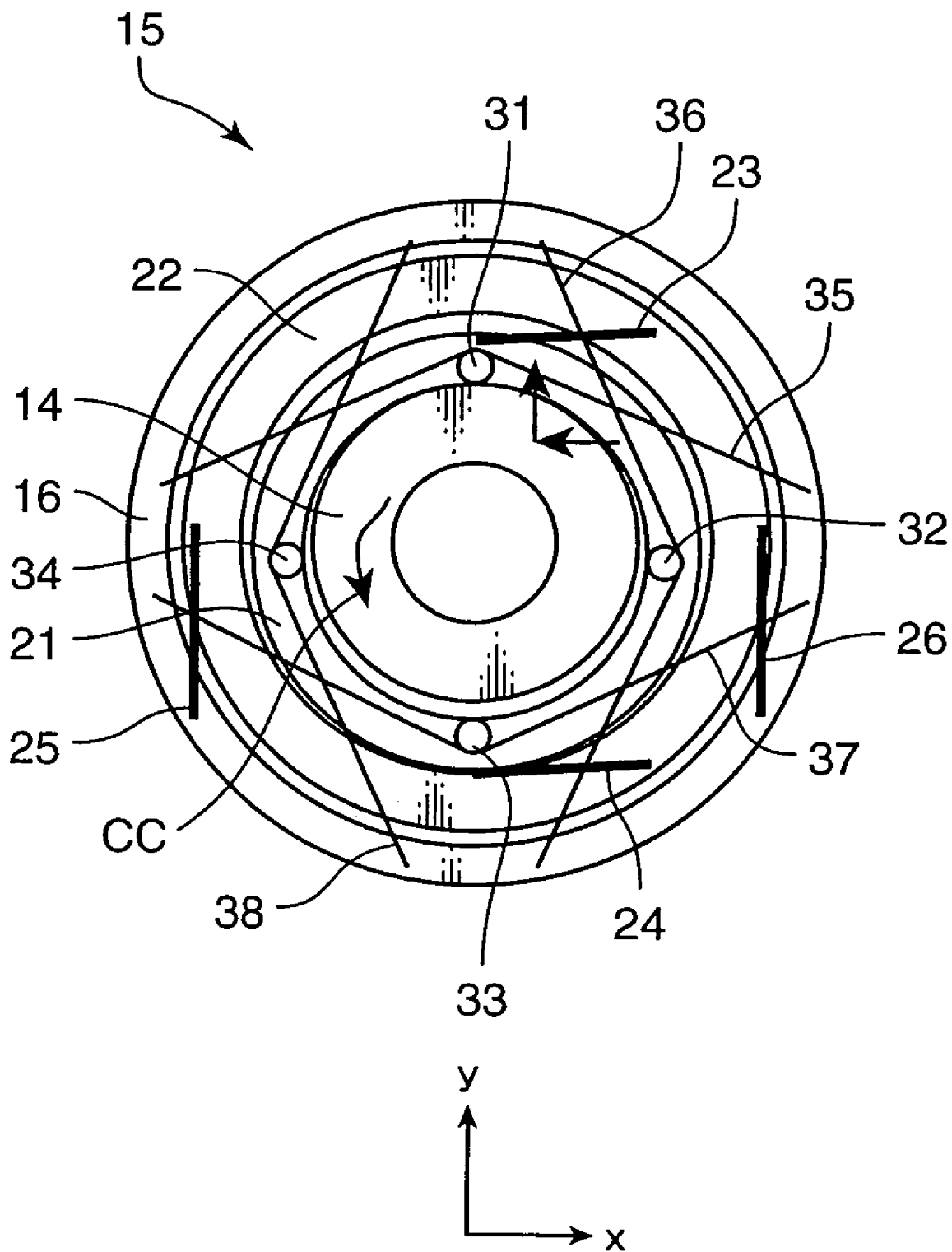
FIG. 2 is an illustration for describing an operation of a driver assembly in the zoom unit shown in FIG. 1.

FIG. 2 is an illustration schematically showing the driver assembly 15 in the zoom unit 1 having the above construction. Four cylindrical projections 31, 32, 33, and 34 are attached circumferentially and substantially equidistantly away from each other by 90° about the center of rotation of the cylindrical cam 14. Longitudinally and substantially middle parts of shape metal alloy (SMA) actuators 35, 36, 37, and 38 each in the form of a wire or a belt (hereinafter, called as "SMA wires") are wound over the cylindrical projections 31, 32, 33, and 34, respectively. Both ends of each SMA wire 35, 36, 37, 38 are caulked by terminals 39, respectively. Thus, the SMA wires 35 through 38 are fixed to the base block 16 at the respective fixed positions in such a manner that each SMA wire 35, 36, 37, 38 is bent into a substantially L-shape at the corresponding cylindrical projection.

Each SMA wire 35, 36, 37, 38 has a thin string-like shape, with a shorter size in cross-section in a direction perpendicular to a longitudinal direction thereof, i.e. a smallest diameter, of e.g. 100 µm or less. Each SMA wire 35, 36, 37, 38 is made of e.g. Ni—Ti—Cu alloy. The SMA wire made of Ni—Ti—Cu alloy has a distortion amount of about 4%. Assuming that the length of each SMA wire 35, 36, 37, 38 is 40 mm, a stroke of 1.6 mm can be obtained. If each SMA wire 35, 36, 37, 38 is wound on the drive gear 21 with a bent angle of 120° at the corresponding cylindrical projection, an eccentricity amount of the drive gear 21 is about 1.715 mm, which provides precision sufficient for designing a drive mechanism. In the example of FIGS. 1 and 2, the four cylindrical projections are arranged away from each other by 90° about the center of rotation of the cylindrical cam 14. Alternatively, three projections, or more than four projections may be provided. Also, the middle parts of the SMA wires 35 through 38 may be interconnected to the drive gear 21 by way of a sleeve engagement, a resilient hinge, or a like engagement, in place of using the cylindrical projections 31 through 34.

The both ends of each SMA wire 35, 36, 37, 38 are caulked by the terminals 39, respectively. The terminals 39 each is constituted of a conductive member, and connected to an unillustrated drive circuit. With this arrangement, the SMA wires 35 through 38 are energizable individually by the drive circuit. The SMA wires 35 through 38 each memorizes its contraction amount of a certain size in advance. When each SMA wire 35, 36, 37, 38 generates heat in response to energization thereto by the drive circuit, the temperature of each SMA wire 35, 36, 37, 38 reaches a certain temperature. Thereby, each SMA wire 35, 36, 37, 38 is contracted into its memorized initial shape. On the other hand, when each SMA wire 35, 36, 37, 38 is de-energized, the temperature thereof is lowered, and as a result, the elastic modulus thereof is lowered.

FIGS. 3A through 3D are timing charts describing energization controls of the SMA wires 35 through 38, respectively. At the timing t1, a current is supplied to none of the SMA wires 35 through 38. Accordingly, the SMA wires 35 through 38 pull each other with a moderate force in a well-balanced manner, and retain their initial states where energization to the SMA wires 35 through 38 is suspended. In this state, the drive gear 21 is not interconnected to the cylindrical cam 14.

At the timing t2, when one of the SMA wires 35 through 38 is energized, (hereinafter, the control is described by taking an example of the SMA wire 35), and heat is generated, the energized SMA wire 35 is contracted into its memorized shape against resilient forces of the SMA wire 36 through 38 to which the current is not supplied. The restoring force capable of restoring the shape of the SMA wire to its memorized shape differs depending on the temperature of the SMA wire. Accordingly, it is possible to regulate the restoring force of each SMA wire 35, 36, 37, 38 by controlling the current value for energization so as to regulate the heat generating temperature of each SMA wire 35, 36, 37, 38.

The energization to the SMA wire 35 is continued until the timing t3, at which the energization is suspended. FIG. 2 shows a state that the energization to the SMA wire 35 is suspended at the timing t3. Since the SMA wire 35 is contracted from its initial shape, the drive gear 21 receives a force in y direction, whereby the drive gear 21 is interconnected to the cylindrical cam 14. Then, at the timing t3, the SMA wire 36 is started to be energized. When a current is supplied to the SMA wire 36, similarly to the case of the SMA wire 35, the SMA wire 36 is contracted against resilient forces of the non-energized SMA wires 35, 37, and 38. At this time, since the drive gear 21 has already been interconnected to the cylindrical cam 14, the cylindrical cam 14 is rotated counterclockwise as shown by the arrow CC in FIG. 2 due to the contraction force of the SMA wire 36.

The energization to the SMA wire 36 is continued until the timing t4, at which the energization is suspended. Thereafter, similarly to the above control, the SMA wire 37 is energized until the timing t5, and then, the SMA wire 38 is energized until the timing t6, thereby enabling to keep rotating the cylindrical cam 14 counterclockwise. In other words, the cylindrical cam 14 is rotated counterclockwise by energizing the SMA wires in the order of 35, 36, 37, and 38 in clockwise direction. A rotation angle δ of the cylindrical cam 14 in this driving is represented by the following equation, assuming that Z1 represents the number of the teeth 21c of the drive gear 21, and Z2 represents the number of the teeth 14c of the cylindrical cam 14.

$$\delta=(Z1-Z2)/Z2\times 360°$$

Conversely to the above, the cylindrical cam 14 is rotated clockwise by energizing the SMA wires in the order of 38, 37, 36, and 35 in counterclockwise direction. Thus, the cylindrical cam 14 as the output rotary member, the base block 16, the drive gear 21 constituting the driver assembly 15, the intermediate frame 22, and the SMA wires 35 through 38 constitute a motor. The motor capable of changing its rotating direction merely by changing the order of driving the SMA wires in the embodiment is useful because there is no need of detecting the position of the SMA wire whose energization is suspended in the previous driving, and specifying the SMA wire whose energization is to be started.

Now, the above driving is observed in the aspect of phase. Assuming that a period from the point of time when a first-time energization to the SMA wire 35 is started to the point of time when the energization to the SMA wire 35 is resumed is defined as a cycle T, a time interval between the timings t2 and t3, between the timings t3 and t4, between the timings t4 and t5, and between the timings t5 and t6 (or t2) corresponds to a time duration obtained by dividing the cycle T by four. In other words, energization to the SMA wires 35 through 38 is conducted by phase displacement of 90°. Specifically, the energization timing for the respective SMA wires 35 through 38 is determined in conformity to the angular displacement (=90°) of the cylindrical projections 31 through 34. Accordingly, if three cylindrical projections are disposed away from each other by 120°, it is possible to perform a driving similar to the above driving by using three SMA wires and by shifting the energization timing for the respective SMA wires by 120° in phase.

In the embodiment, the energization period Ton for the respective SMA wires 35 through 38 is made coincident to the time duration obtained by dividing the cycle T by four. Alternatively, the energization period Ton may be shortened. A shortened energization period may decrease a torque to be generated, but lowers a required electric power, which is effective in energy saving. In other words, it is optional to define the energization period Ton relative to the time duration obtained by dividing the cycle T by four. It is possible to control the characteristics of the motor based on the energization period Ton. The rotating speed of the cylindrical cam 14 can be varied by varying the cycle T.

With the above arrangement, the contraction and expansion of the linear-type SMA wire 35, 36, 37, 38 having a high responsive rate and capable of generating a large force can be converted into a rotating force by the oscillatory drive gear 21 with its rotation being restrained, namely, the position thereof being retained, whereby the cylindrical cam 14 can be drivingly rotated. This enables to produce the compact and less costly zoom unit 1. The zoom unit 1 is incorporated in a lens barrel of an unillustrated lens device. It is needless to say that the lens device can be arbitrarily designed with use of well-known means.

The above description is made on a premise that the teeth 14c of the cylindrical cam 14 are external teeth, and the teeth 21c of the drive gear 21 are internal teeth. Alternatively, a bevel gear or an equivalent member may be used so that the teeth 14c of the cylindrical cam 14 and the drive gear 21 are meshed with each other in the optical axis direction of the zoom unit 1. The teeth may have an arbitrary shape such as a cycloid, in place of the involute teeth as shown in FIG. 1.

Second Embodiment

Figure 4:
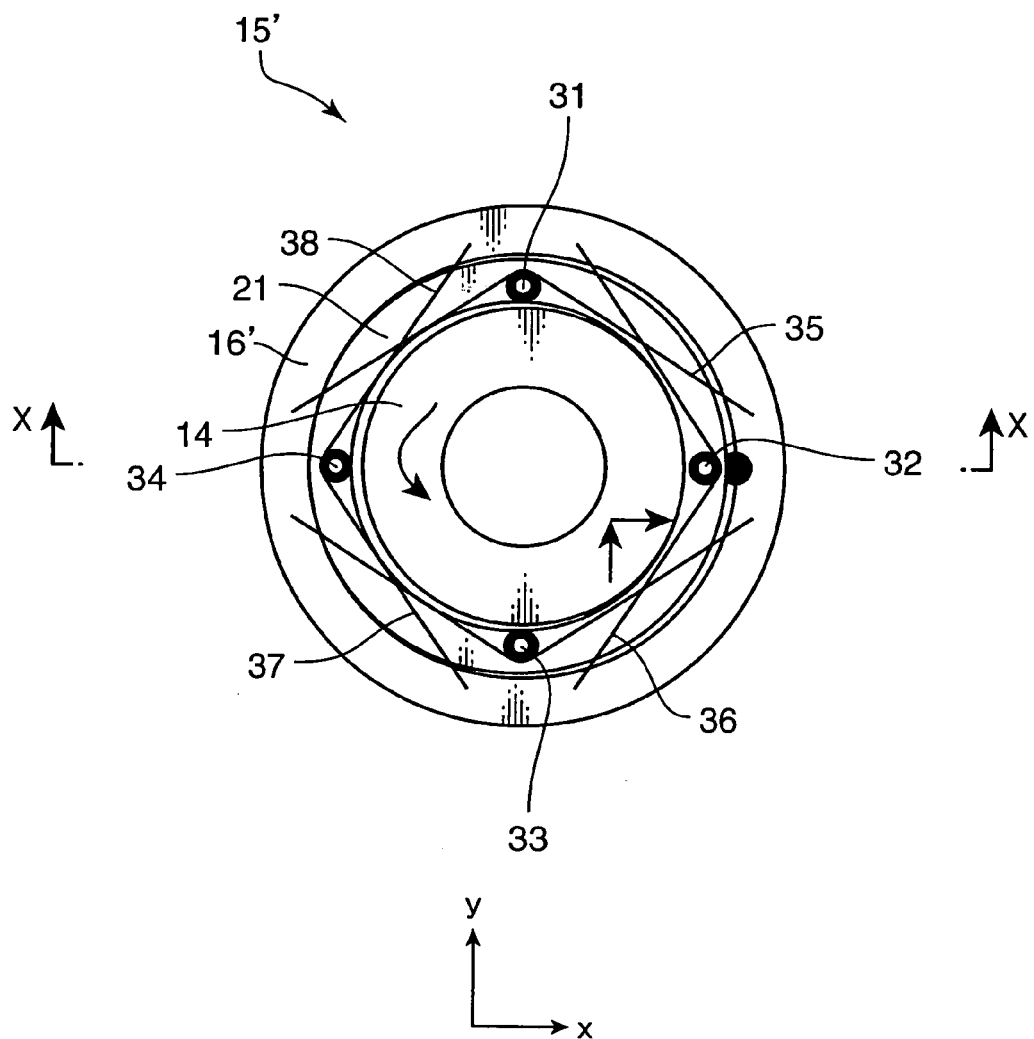
FIG. 4 is an illustration schematically showing a construction of a driver assembly in a zoom unit for use in an image sensing apparatus, serving as a lens drive mechanism in accordance with a second embodiment of the invention.
Figure 5:
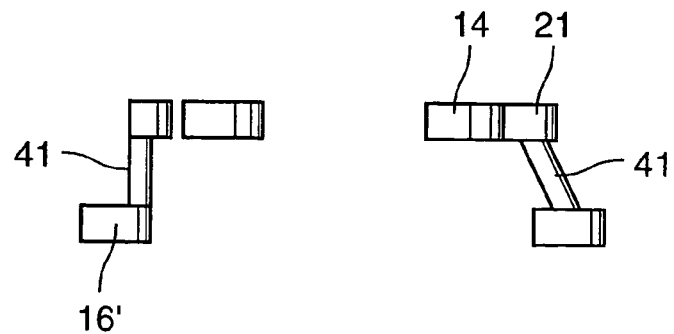
FIG. 5 is a cross-sectional view taken along the line X-X in FIG. 4.

FIG. 4 is an illustration schematically showing a construction of a driver assembly 15' in a zoom unit for use in an image sensing apparatus, which serves as a lens drive mechanism in accordance with a second embodiment of the invention. FIG. 5 is a cross-sectional view taken along the line X-X in FIG. 4. Elements in FIG. 4 which are equivalent to those in FIG. 2 and have the same arrangement as the arrangement in FIG. 2 are denoted by the same reference numerals, and elements in FIG. 4 whose arrangement is similar to those in FIG. 2 are denoted by the like reference numerals with an apostrophe ' attached thereto. In the driver assembly 15', a drive gear 21 is directly supported on a base block 16' by a support rod 41, in place of the intermediate frame 22 and the parallel spring pairs 23, 24; and 25, 26.

In this embodiment, at least one e.g. four support rods 41 are provided. In the case where the plural support rods 41 are provided, the support rods 41 are substantially equidistantly arranged along a circumference of a drive gear 21. Each support rod 41 has an elasticity in x-direction and y-direction, but is devoid of elasticity in a torsional direction. With this arrangement, the drive gear 21 is allowed to be movable solely in x-direction and y-direction with respect to the base block 16', and the drive gear 21 is oscillated with its rotation being restrained, namely, the position thereof being retained.

In the arrangement described in the second embodiment, expansion and contraction of linear-type SMA wires 35 through 38 made of a shape metal alloy can be converted into a rotating force by the drive gear 21 which is oscillated with its position retained, thereby enabling to drivingly rotate a cylindrical cam 14.

Third Embodiment

Figure 6:
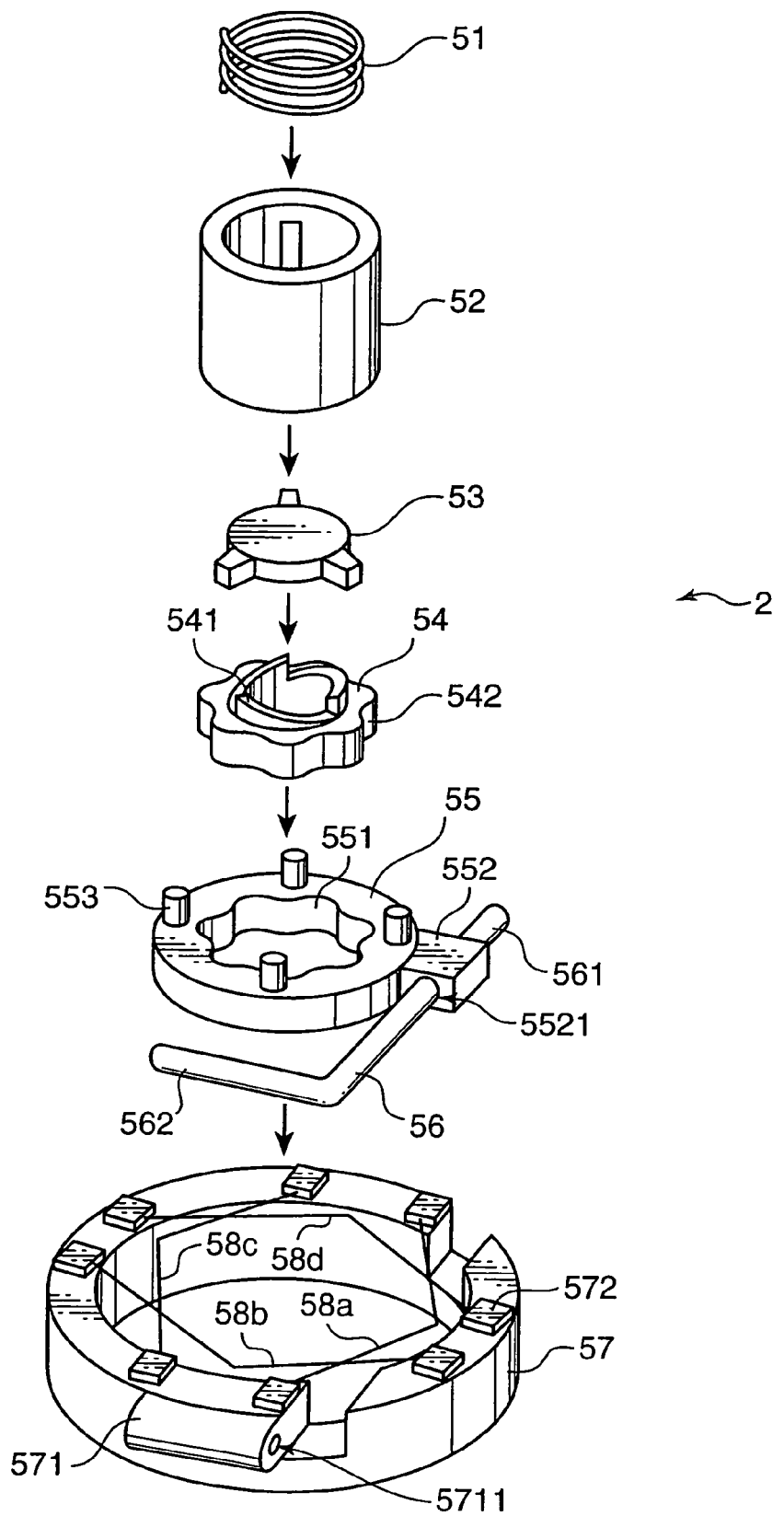
FIG. 6 is an exploded perspective view showing an example of an arrangement of a focus lens drive mechanism in accordance with a third embodiment of the invention.

FIG. 6 is an exploded perspective view showing an example of an arrangement of a focus lens drive mechanism (hereinafter, called as "focus unit") in accordance with a third embodiment of the invention. The focus unit 2 includes a bias spring 51, a rectilinear guide cylinder 52, a focus lens element 53, a cylindrical cam 54, an annular gear 55, a position retaining guide 56, and a base block 57. In this arrangement, the focus lens element 53 is guided merely in an optical axis direction of the focus unit 2 by the rectilinear guide cylinder 52. Also, the focus lens element 53 comes into pressing contact with the cylindrical cam 54 by an urging force of the bias spring 51 acting in a forward direction along the optical axis of the focus unit 2. The cylindrical cam 54 has a cam surface 541 extending in the optical axis direction, and an outer cycloid gear 542 at a radially outer position. The cylindrical cam 54 is rotatably supported about the optical axis.

The ring-like annular gear 55 is arranged around an outer surface of the cylindrical cam 54. The annular gear 55 has an inner cycloid gear 551. The inner cycloid gear 551 of the annular gear 55 and the outer cycloid gear 542 of the cylindrical gear 54 are interconnected to each other by gear engagement. Also, rotation of the annular gear 55 about the optical axis is restrained by the position retaining guide 56. The position retaining guide 56 is, for instance, a substantially L-shaped guide rod or a guide member. An end portion 561 and the other end portion 562 of the position retaining guide 56 are loosely received in the annular gear 55, specifically, in a through-hole 5521, serving as a receiving portion, of a support member 552 formed on the annular gear 55, and in the base block 57 provided around the outer surface of the annular gear 55, specifically, in a through-hole 5711, serving as a receiving portion, of a support member 571 formed on the base block 57, respectively, so that the position retaining guide 56 is slidably movable in the respective axial directions of the one end portion 561 and the other end portion 562. With this arrangement, the base block 57 and the annular gear 55 are made slidably movable in orthogonal directions to each other. In other words, the guide member, and the receiving portions constitute a guide mechanism, which is adapted to retain the position of the annular gear 55 relative to the base block 57 i.e. the focus unit 2.

Four cylindrical projections 553 each extending in the optical axis direction are arranged circumferentially and substantially equidistantly away from each other by 90°. Four SMA wires 58a, 58b, 58c, and 58d are provided on the base block 57 in a state that each SMA wire 58a, 58b, 58c, 58d is wound into a substantially L-shape over the corresponding cylindrical projection 553, with a certain tension force being applied thereto. Substantially middle parts of the respective SMA wires 58a, 58b, 58c, 58d come into contact with the corresponding cylindrical projection 553. Both ends of each SMA wire 58a, 58b, 58c, 58d are jointed to SMA retaining blocks 572 fixedly attached to an upper circumferential surface of the base block 57. In this embodiment, eight SMA retaining blocks 572 are provided. The substantially L-shaped SMA wire 58a, 58b, 58c, 58d is obtained by angularly displacing the SMA wires from each other by 90° about the optical axis. Each SMA retaining block 572 is connected to an unillustrated drive circuit so that a current is selectively supplied to the SMA retaining blocks 572. The base block 57 is fixed to an unillustrated fixing member to support the SMA wires 58a through 58d, and the position retaining guide 56.

Figure 7:
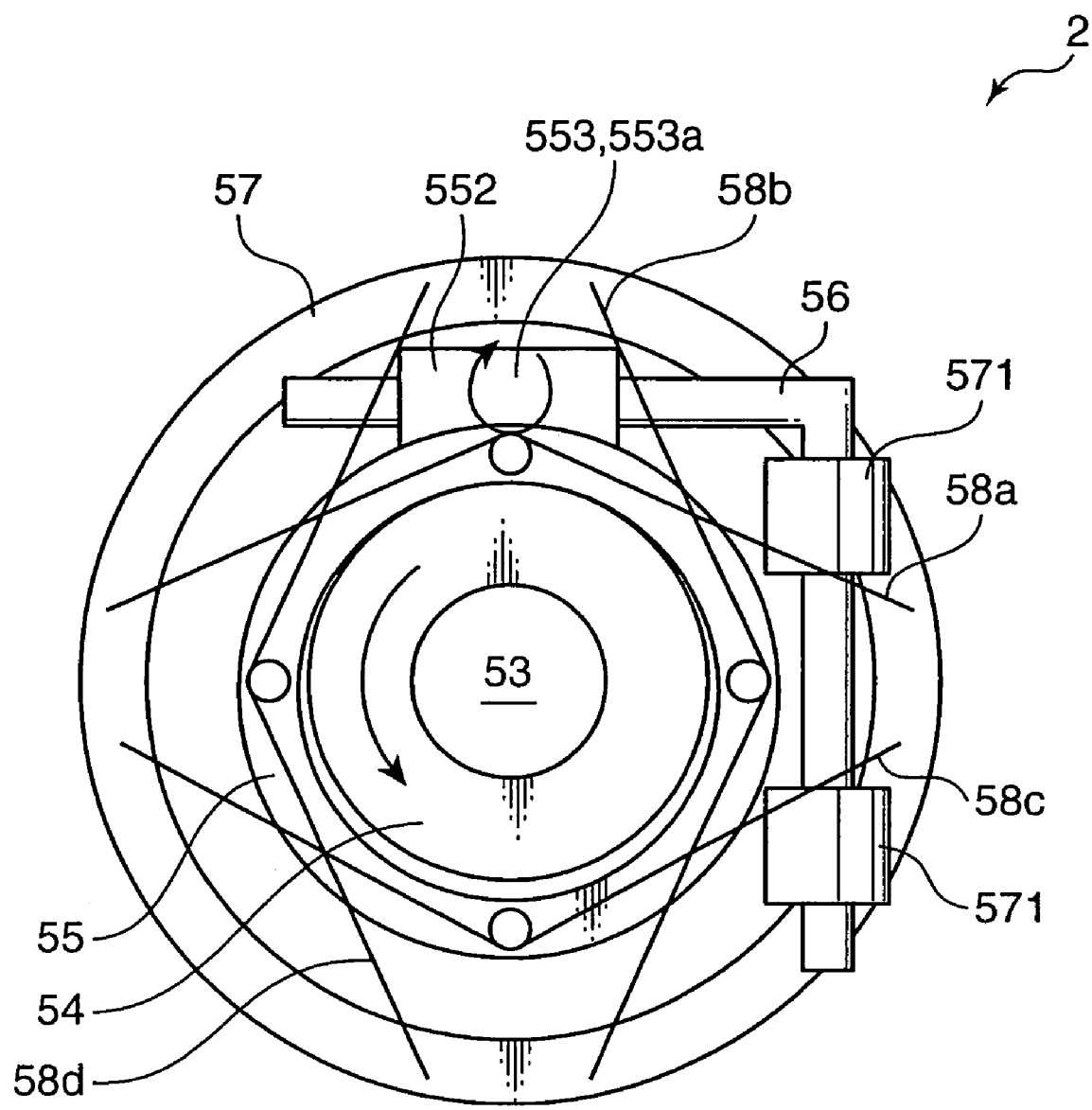
FIG. 7 is an illustration schematically showing a drive state of the focus unit shown in FIG. 6, viewed from an optical axis direction.

FIG. 7 is an illustration schematically showing a drive state of the focus unit 2 shown in FIG. 6, viewed from the optical axis direction, in which the respective parts are assembled together. In FIG. 7, the bias spring 51 and the SMA retaining blocks 572 are not illustrated. Also, as shown in FIG. 7, the two support members 571 are formed on the base block 57.

FIGS. 8A through 8D are timing charts showing energization timings for the SMA wires 58a through 58d, respectively. The upper through the lower timing charts are timing charts for supplying a current to the SMA wires 58a, 58b, 58c, and 58d in this order. Each SMA wire 58a, 58b 58c, 58d memorizes its contraction amount of a certain size. The SMA wires 58a through 58d are so configured that when the temperature of each SMA wire 58a, 58b, 58c, 58d reaches a certain temperature by energization thereto, each SMA wire 58a, 58b, 58c, 58d is restored into its memorized shape.

Figure 8:
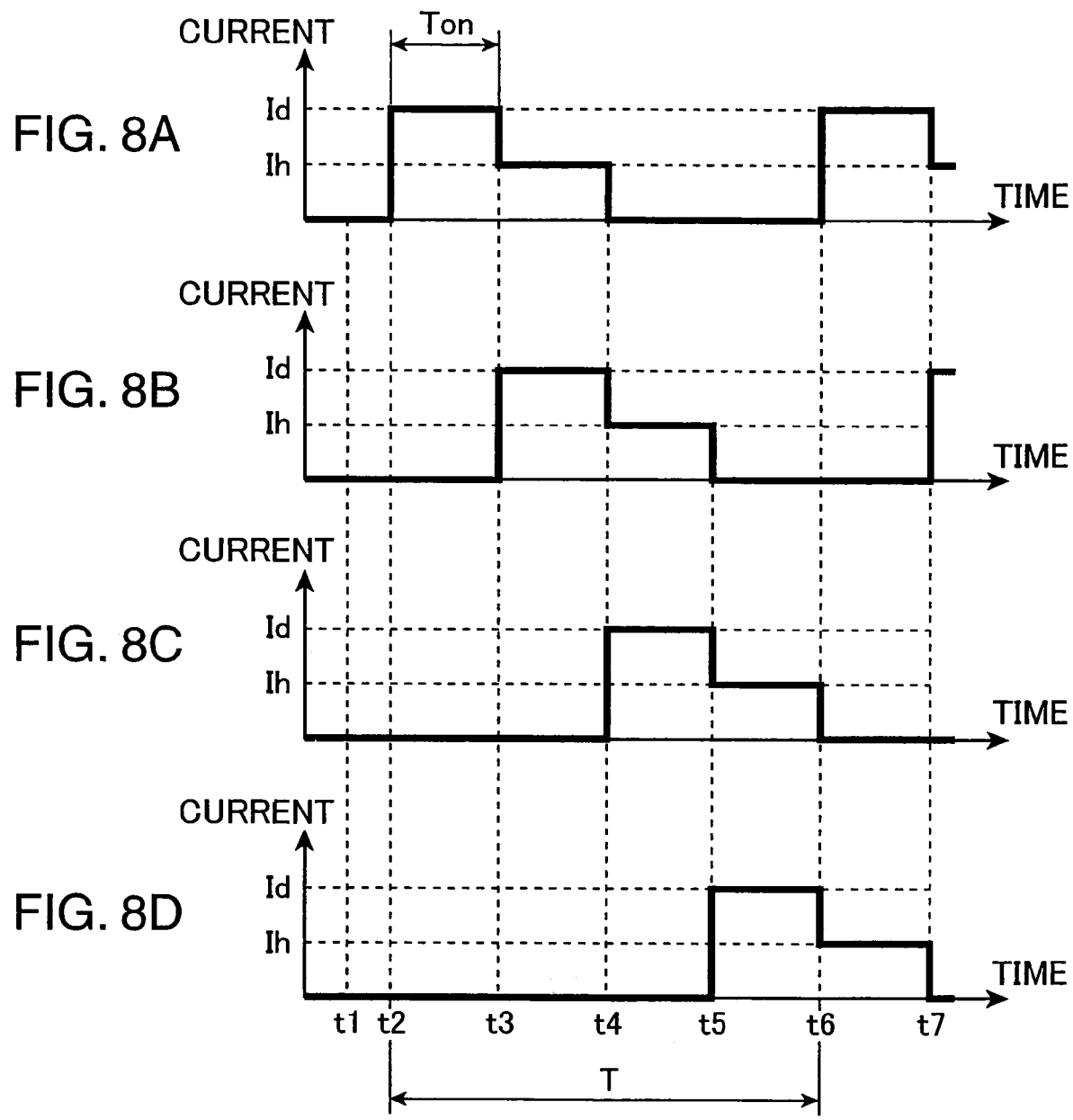
FIGS. 8A through 8D are timing charts showing energization timings of respective SMA actuators shown in FIGS. 6 and 7.

Referring to FIGS. 7 and 8, as well as FIG. 9 to be described later, a driving operation of the annular cam 54 and the annular gear 55 of the focus unit 2 is described. Referring to FIGS. 8A through 8D, a current is supplied to none of the SMA wires 58a through 58d at the timing t1. Accordingly, the SMA wires 58a through 58d pull each other with a moderate force in a well-balanced manner, and retain their initial states where energization to the SMA wires 58a through 58d is suspended. In this state, the annular gear 55 is not interconnected to the cylindrical cam 54.

At the timing t2, a current Id is started to be supplied to the SMA wire 58a for energization. In response to heat generation by the current supply, the SMA wire 58a is contracted into its memorized shape against resilient forces of the SMA wires 58b, 58c, and 58d to which the current is not supplied. The energization to the SMA 58a is controlled in such a manner that the current Id is temporarily lowered to a current Ih at the timing t3, and then, the energization by the supply of the current Ih is continued until the timing t4, at which the current supply is suspended. Since the SMA wire 58a is contracted from its initial state, the cylindrical projection 553 i.e. a cylindrical projection 553a over which the SMA wire 58a is wound is subjected to the contraction force. As a result, the annular gear 55 is interconnected to the cylindrical cam 54 by gear engagement.

Subsequently, at the timing t3, energization to the SMA wire 58b is started. FIG. 7 shows a state of the SMA wire 58b immediately after start of the energization by supply of a current Id thereto. When the current Id is supplied to the SMA wire 58b, the SMA wire 58b is contracted against resilient forces of the SMA wires 58a, 58c, and 58d in a similar manner as in the case where the SMA 58a is contracted. Since the annular gear 55 has already been interconnected to the cylindrical cam 54 by gear engagement at this time, the cylindrical cam 54 is rotated counterclockwise by a contraction force of the SMA wire 58b. If a stress of the SMA 58a is gone before energization to the SMA 58b is started, the annular gear 55 may be disengaged from the cylindrical cam 54 due to an action of the annular gear 55 to return to its balanced position. In view of this, supplying a little current to the SMA wire 58a enables to securely suppress the returning action of the annular gear 55 in light of a hysteresis of the SMA wire, thereby eliminating the gear disengagement (see FIG. 9, which will be described later). Similarly to the control of the SMA wire 58a, the energization to the SMA wire 58b is temporarily lowered from the supply of the current Id to the supply of a current Ih at the timing t4, and the supply of the current Ih is continued until the timing t5, at which the current supply is suspended.

Similarly to the above, driving is performed in such a manner that energization to the SMA wire 58c is continued until the timing t6, and then, energization to the SMA wire 58d is continued until the timing t7, whereby the cylindrical cam 54 is kept on rotating counterclockwise. Specifically, the cylindrical cam 54 is rotated counterclockwise by energizing the SMA wires in the order of 58a, 58b, 58c, and 58d in clockwise direction. A rotation angle δ of the cylindrical cam 54 in this driving is represented by the following equation, assuming that Z1 represents the number of the teeth of the annular gear 55, and Z2 represents the number of the teeth of the cylindrical cam 54.

$$\delta=(Z1-Z2)/Z2\times360°$$

Conversely to the above, the cylindrical cam 54 is rotated clockwise by energizing the SMA wires in the order of 58a, 58d, 58c, and 58b in counterclockwise direction.

Now, the above driving is observed in the aspect of phase. Assuming that a period from the point of time when a first-time energization to the SMA wire 58a is started to the point of time when the energization to the SMA wire 58a is resumed is defined as a cycle T, a time interval between the timings t2 and t3, between the timings t3 and t4, between the timings t4 and t5, and between the timings t5 and t6 (or t2) corresponds to a time duration obtained by dividing the cycle T by four. In other words, energization to the SMA wires 58a through 58d is conducted by phase displacement of 90°. Specifically, the energization timing for the respective SMA wires 58a through 58d is determined in conformity to the angular displacement (=90°) of the cylindrical projections. Accordingly, if three cylindrical projections are disposed away from each other by 120°, it is possible to perform a driving similar to the above driving by using three SMA wires and by shifting the energization timing for the respective SMA wires by 120° in phase.

Figure 9:
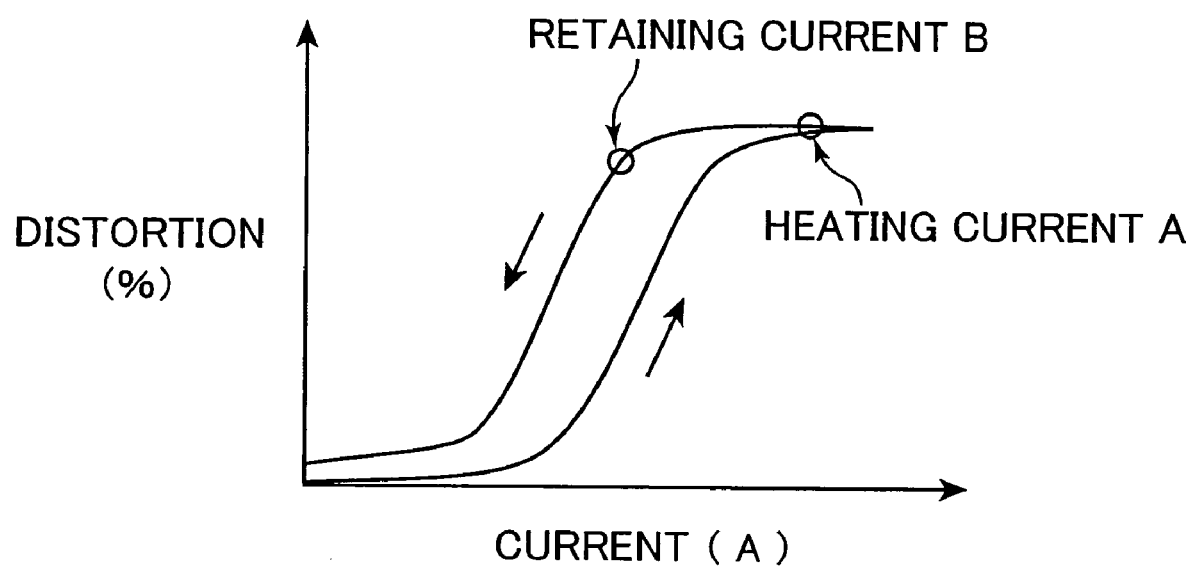
FIG. 9 is a hysteresis graph regarding current-to-distortion characteristic, representing a relation between a current to be supplied to the respective SMA wires, and a displacement thereof.
Figure 10:
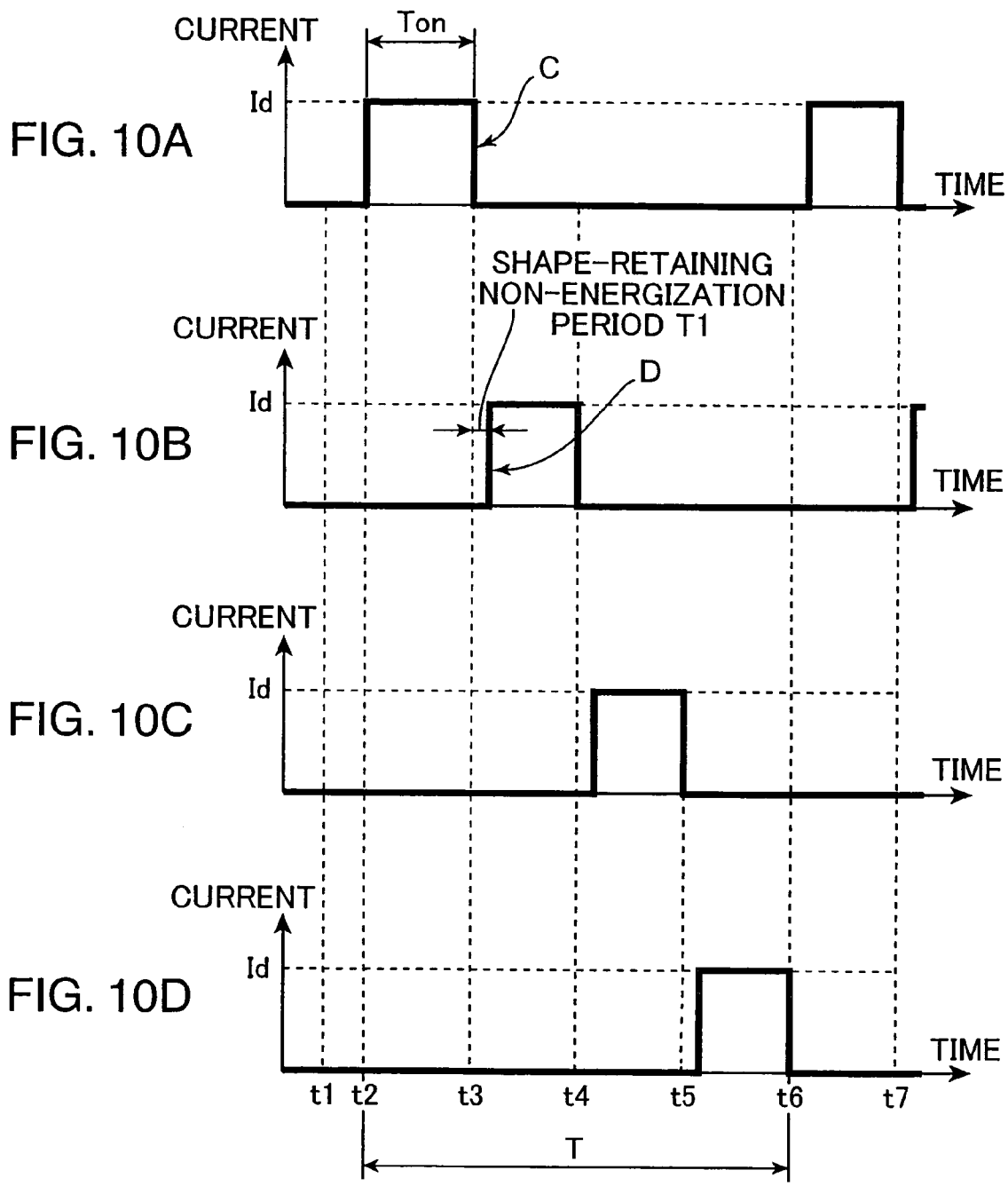
FIGS. 10A through 10D are timing charts showing energization timings for the respective SMA actuators in a modified energization control.
Figure 11:
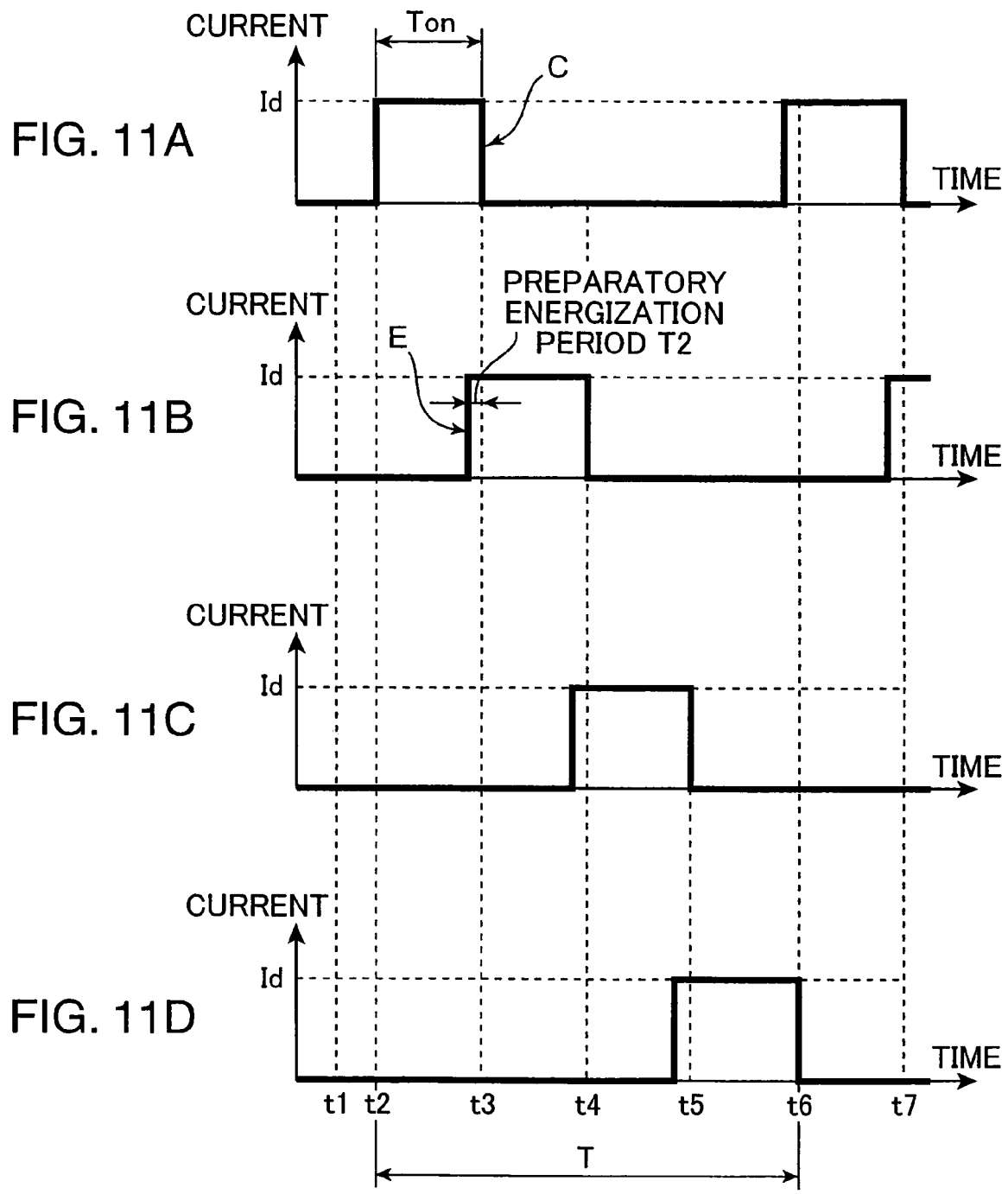
FIGS. 11A through 11D are timing charts showing energization timing for the respective SMA actuators in another modified energization control.

FIG. 9 is a hysteresis graph on current-to-distortion characteristic, representing a relation between a current to be supplied to the respective SMA wires, and a displacement thereof. The currents A and B shown in the characteristic graph of FIG. 9 correspond to the currents Id and Ih described in the foregoing section referring to FIG. 8, respectively. As an energization amount is increased, the SMA wire is abruptly contracted when the energization reaches a certain level. When the contraction amount of the SMA wire reaches a certain degree, or the contraction is suspended, the amount of the current supply keeps on increasing, without changing the distortion. Conversely, as the energization amount is gradually decreased, the distortion is not decreased until the amount of the current supply falls below a certain level, as compared with the case where the amount of the current to be supplied keeps on increasing. The current Id used for heating the SMA wire, i.e., the heating current indicated by the arrow A, and the current Ih used for retaining the temperature of the SMA wire, i.e., the retaining current indicated by the arrow B, for instance, are determined based on the hysteresis of the SMA wire. This control enables to retain the distortion i.e. a contact of the cylindrical cam 54 with the annular gear 55, with a less current, as compared with the case where the heating current is supplied.

Utilizing the hysteresis as mentioned above enables to simultaneously energize adjacent two SMA wires among the SMA wires, for instance, by shifting the SMA wires for the simultaneous energization in such an order that the SMA wires 58a and 58b are energized, then, the SMA wires 58b and 58c are energized, and then the SMA wires 58c and 58d are energized, and then, the SMA wires 58d and 58a are energized. In this arrangement, the respective energization amounts to energize the adjacent two SMA wires may be an energization amount to be obtained by supply of a first current capable of attaining a temperature equal to or larger than a deformation start temperature at which the SMA wire is started to be deformed, and an energization amount to be obtained by supply of a second current, which is smaller than the first current, and is capable of retaining the substantially same deformed state as the above deformed state. Specifically, the current supply is controlled, for instance, in such an order that the first current is supplied to the SMA wire 58a, and the second current is supplied to the SMA wire 58b; then, the first current is supplied to the SMA wire 58b, and the second current is supplied to the SMA wire 58c; then, the first current is supplied to the SMA wire 58c, and the second current is supplied to the SMA wire 58d; and then, the first current is supplied to the SMA wire 58d, and the second current is supplied to the SMA wire 58a. With this arrangement, an electric power can be saved by the amount corresponding to a difference between the first current and the second current, as compared with an arrangement that the same current, in this case, the first current is supplied to the respective SMA wires 58a through 58d.

Figure 3:
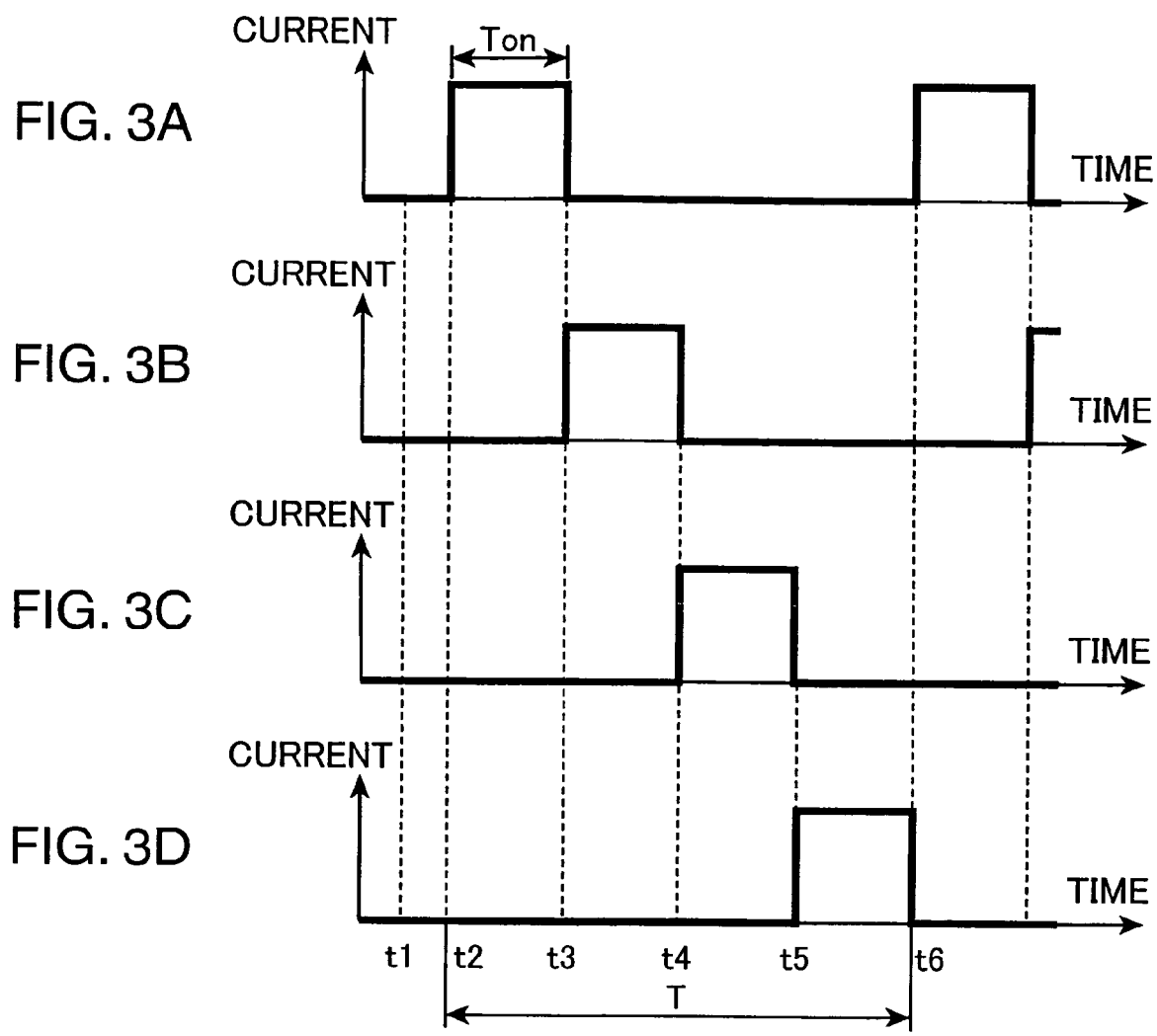
FIGS. 3A through 3D are timing charts showing energization control of respective SMA actuators shown in FIG. 2.

Utilizing the hysteresis provides substantially the same effect as a technique of flowing a minute electric current, without likelihood that distortion may become substantially zero immediately after completion of the energization to the respective SMA wires in the sequential energization as shown in FIG. 3. In particular, the same effect can be obtained in a high-temperature condition, even if an energization interval is extended, as compared with the example in FIG. 3, namely, even if a next energization start timing is set within a cooling period following the point of time of completion of the previous energization. Specifically, as shown in FIGS. 10A through 10D, an energization control may be performed in such a manner that energization to the next SMA wire i.e. the SMA wire 58b is started upon lapse of a certain period T1 (hereinafter, also called as "shape-retaining non-energization period") from the timing t3, indicated by the symbol C, at which the first-time energization to a certain SMA wire i.e. the SMA wire 58a has been completed. The energization start timing to the succeeding SMA wire can be defined in a similar manner as mentioned above. A required distortion amount is secured even if actual energization is not conducted in the shape-retaining non-energization period T1. In the above energization control, a shape retaining effect i.e. a distortion amount retaining effect can be obtained, similarly to the energization control as shown in FIG. 3. Thereby, an energy-saving-oriented device superior in energy efficiency can be realized.

In the focus unit 2 of the embodiment, a temperature detector such as a temperature sensor (not shown) for detecting the temperature of the respective SMA wires is provided in the vicinity of the SMA wires in order to accurately detect the temperature of the respective SMA wires. The temperature detector is connected to a drive circuit. The drive circuit controls an energization time and an energization interval of the respective SMA wires based on the temperature information detected by the temperature detector. Specifically, in the case where it is judged that the temperature of the respective SMA wires itself which has been detected by the temperature sensor, or the ambient temperature around the SMA wires is higher than a predetermined threshold value (this state is referred to as "high temperature condition"), as shown in FIGS. 10A through 10D, the energization control of delaying the energization start timing by the period T1 is performed to extend the energization interval of sequentially energizing the SMA wires i.e. SMA actuators, or to shorten the energization time for the respective SMA actuators.

In the case where it is judged that the temperature of the respective SMA wires itself which has been detected by the temperature sensor is lower than a predetermined threshold value (this state is referred to as "low temperature condition"), as shown in FIGS. 11A through 11D, for instance, an energization control may be performed in such a manner that energization to a next SMA wire i.e. the SMA wire 58b is started at a timing earlier than the timing t3, indicated by the symbol C, at which the first-time energization to the SMA wire 58a has been completed, by a certain period T2 (hereinafter, also called as "preparatory energization period T2") in order to shorten the energization interval for energizing the respective SMA actuators or to extend the energization time for the respective SMA actuators in the sequential energization. It should be noted that the threshold temperature in the low temperature condition may be identical to or different from the threshold temperature for use in judging whether the detected temperature lies in the high temperature condition. The energization start timing for the succeeding SMA wire can be defined in a similar manner as mentioned above. Thereby, the energization time i.e. the heating time for the respective SMA wires can be extended by the preparatory energization period T2, as compared with the arrangement shown in FIG. 3. In other words, it is possible to start the energization earlier than the arrangement shown in FIG. 3 by the preparatory energization period T2. This enables to securely obtain a required distortion amount of the respective SMA wires even in the low temperature condition, thereby enabling to accurately perform driving rotation of the motor by the drive mechanism.

The foregoing description is made on a premise that a high transmission efficiency is secured between the cylindrical cam 54 and the annular gear 55, and a quiet and friction-resistive cycloid gear is used. The requirements may not be indispensable. Alternatively, an involute gear, which is easily processable and producible with a low cost, or a frictional engagement may be used. The modification is described in the following.

Figure 12:
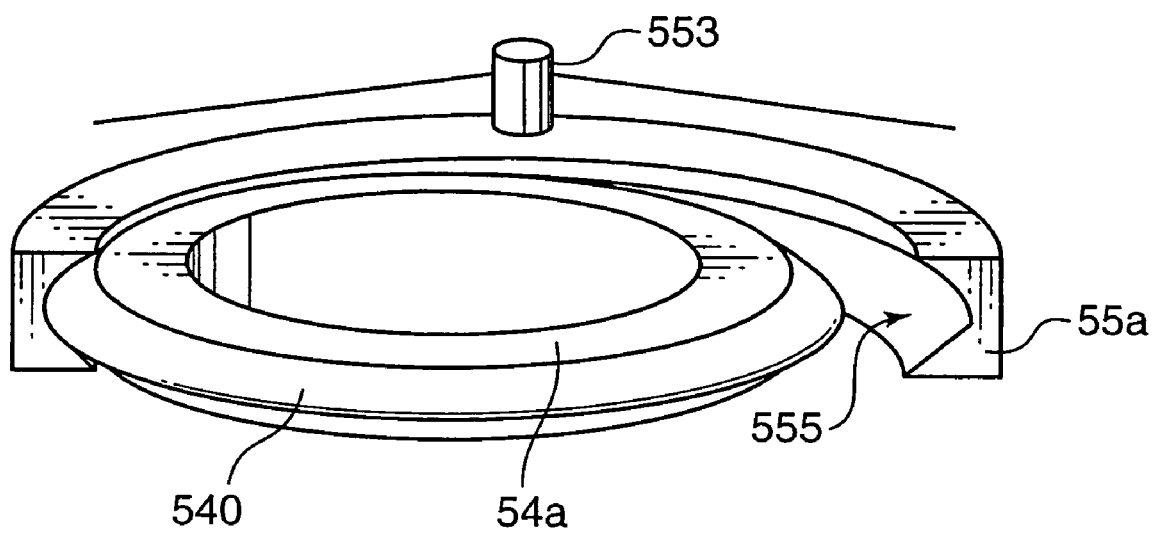
FIG. 12 is a partially enlarged perspective view showing an arrangement of a modified lens drive mechanism in the first through third embodiments of the invention.

FIG. 12 is a partially enlarged perspective view of a modified arrangement, in which a frictional engagement by frictional members i.e. a cylindrical cam 54a and an annular gear 55a is employed, in place of the gear engagement using a cycloid gear or a like member in the drive mechanisms of the first through third embodiments. In the modification, the cylindrical cam 54a has a radially outwardly protruding circumferential portion 540, serving as a contact portion, in place of the external teeth of the cycloid gear. The circumferential portion 540 is made of e.g. a rubber material having a required frictional coefficient i.e. capable of exhibiting a required frictional force. The annular gear 55a is formed with a V-shaped recess portion 555, serving as a contact portion, around the inner circumference thereof, in place of the external teeth of the cycloid gear. The recess portion 555 is made of e.g. a rubber material having a required frictional coefficient i.e. capable of exhibiting a required frictional force, similar to the circumferential portion 540 of the cylindrical cam 54a. With this arrangement, the V-shaped recess portion 555 is brought to a frictional engagement with the circumferential portion 540. This arrangement is provided to increase a contact area of the frictional members so as to enhance a frictional force of the frictional engagement. Alternatively, the contact portion may have a shape such as a flat shape other than the protruding shape or the V-shape. The advantages of the frictional engagement are that the gear can be made smaller by a size corresponding to the tooth height, and that processing of the gear is easy. It is required to strengthen the contact between the frictional members in order to utilize the advantages. As mentioned above, a contact pressure can be secured by energization to a SMA wire having a phase different from the phase of the SMA wire used for generating a driving force. A further advantage of the frictional engagement is that the gear mechanism is usable as a torque limiter for limiting a load. Specifically, the frictional engagement enables to protect the parts in the gear mechanism in the case where an external force is exerted to the gear mechanism, or enables to suppress an output of the motor by restricting a transmission force to the motor if the output exceeds an allowable level. The frictional members each is made of a resin material e.g. a rubber having a large frictional force or a resilient force. The frictional engagement mechanism constituted of the annular gear 55a as a drive member, and the cylindrical cam 54a as a driven member, as shown in FIG. 12, is applicable to the below-mentioned fourth and fifth embodiments.

Fourth Embodiment

As mentioned above, the contact of the cylindrical cam with the annular gear enables to transmit the driving force of the annular gear generated by energization to the SMA wires to the cylindrical cam to thereby rotate the cylindrical cam. It is preferable to maintain the contact of the cylindrical cam with the annular gear in order to perform a desirable rotational driving of a motor. In view of this, a drive mechanism in accordance with a fourth embodiment of the invention is provided with a contact retainer for retaining a contact of a cylindrical cam with an annular gear. In the following, an example of using magnets is described as the contact retainer.

Figure 13:
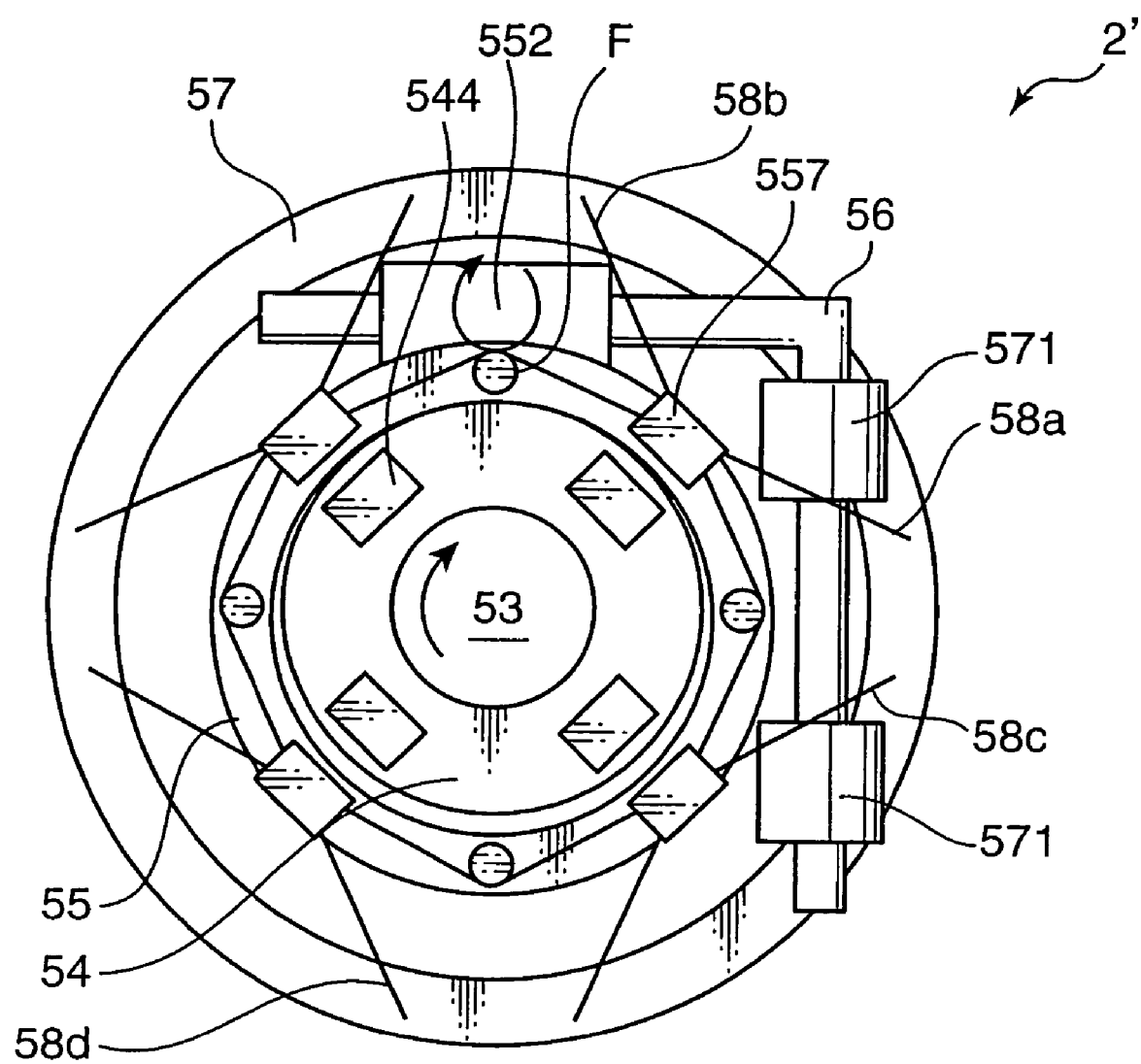
FIG. 13 is a perspective view showing an arrangement of a focus lens drive mechanism in accordance with a fourth embodiment of the invention.

FIG. 13 is an illustration of a focus unit 2' provided with magnets as a contact retainer, viewed from the same direction as shown in FIG. 7. As shown in FIG. 13, a certain number of magnets 544 are substantially equidistantly arranged around an outer circumference of a cylindrical cam 54 away from each other by a certain pitch, for instance. The magnets 544 have predetermined polarities thereof directed in a radial direction of the cylindrical cam 54. Likewise, magnets 557 of the same number as the magnets 544 are substantially equidistantly arranged around an inner circumference of an annular gear 55 away from each other by a certain pitch, for instance. Polarities of the respective magnets 557 are directed in the radial direction opposite to those of the corresponding magnets 544. In other words, the magnets 544 and 557 are arranged individually in such a manner that the polarities of the counterpart magnets 544 and 557 are opposite to each other between the cylindrical cam 54 and the annular gear 55, or between the cylindrical cam 54 and a base block 57, which will be described later, so as to generate an attraction force i.e. a contact force of attracting the cylindrical cam 54 and the annular gear 55, or the cylindrical cam 54 and the base block 57 to each other at a contact position of these two members where these two members come closest to each other.

When SMA wires 58a through 58d are in a de-energized state, the cylindrical cam 54 and the annular gear 55 are eccentrically displaced from each other due to an action of the magnets 544 and 557 whose polarities are opposite to each other, and stabilized at a site indicated by the symbol F in FIG. 13 where the cylindrical 54 and the annular gear 55 are contacted to each other in a state that teeth of the cylindrical cam 54 and teeth of the annular gear 55 are meshed. When the SMA wire (in this case, SMA wire 58d) adjacent the contact site F is energized, the annular gear 55 is moved parallel to the cylindrical cam 54 in contact with the outer surface of the cylindrical cam 54 due to an effect of an L-shaped position retaining guide 56. At this time, the position retaining guide 56 slidably moves. Since the annular gear 55 and the cylindrical cam 54 are interconnected to each other by gear engagement, the cylindrical cam 54 is rotated without sliding over the annular gear 55. This operation is continued until a clearance near a pressing contact site of the energized SMA wire 58d against a corresponding cylindrical projection is gone. The number of the magnets are four in FIG. 13. Accordingly, four sites where the inner-disposed magnets 544 and the outer-disposed magnets 557 are opposed to each other, and four sites corresponding to the middle between the adjacent ones of these four opposing sites, namely, eight sites in total, are provided as stable positions where the cylindrical cam 54 and the annular gear 55 are stably meshed with each other. Vectors of magnetic force are constantly directed radially outwardly in intermediate areas between the adjacent ones of these eight stable positions. Accordingly, there is no likelihood that the cylindrical cam 54 may be disengaged from the annular gear 55. Similarly to the above, when the succeeding SMA wire i.e. the SMA wire 58c is energized, a movement similar to the movement described above is performed, whereby the cylindrical cam 54 is continuously rotated. As the rotation of the cylindrical cam 54 progresses, the phases of the magnets 544 and 557 may be displaced from each other. However, since the vectors of magnetic force are constantly directed radially outwardly as mentioned above, the arrangement is free from a drawback resulting from phase displacement.

In this embodiment, the magnets are arranged on the cylindrical cam 54 and the annular gear 55. Alternatively, a similar effect as in the embodiment can be obtained by arranging magnets on the base block 57 and the annular gear 55. In the modification, magnets of a certain number are arranged substantially equidistantly around the outer circumference of the annular gear 55, with predetermined polarities thereof being directed in the radial direction of the annular gear 55, and magnets of the same number as those on the annular gear 55 are arranged substantially equidistantly on the inner circumference of the base block 57, with polarities thereof opposite to those of the corresponding magnets on the annular gear 55 being directed in the radial direction. The magnets on the annular gear 55 and the magnets on the base block 57 at the side opposite to the side where the annular gear 55 and the cylindrical cam 54 are meshed with each other are attracted to each other. Accordingly, a magnetic force acts in such a direction as to strengthen the gear engagement of the annular gear 55 and the cylindrical cam 54. When the annular gear 55 is slidably moved around the cylindrical cam 54, the counterpart magnets closest to each other on the annular gear 55 and the base block 57 are shifted one after another. However, if three or more magnets are provided for each on the annular gear 55 and the base block 57, a magnetic force to strengthen the gear engagement of the annular gear 55 and the base block 57 acts owing to resultant forces of the magnets in intermediate areas between the adjacent ones of the opposing sites of the counterpart magnets on the annular gear 55 and the base block 57, as in the arrangement of the embodiment. Also, the modification is free from the phase displacement of magnets as mentioned in the foregoing section. The energizing approach for the SMA wires 58a through 58d as described in the first embodiment referring to FIG. 3 may be applicable to the fourth embodiment and to the modification thereof. It is possible to use charge retaining members capable of acquiring magnetic poles i.e. lines of magnetic force, in place of the magnets.

Fifth Embodiment

Figure 14:
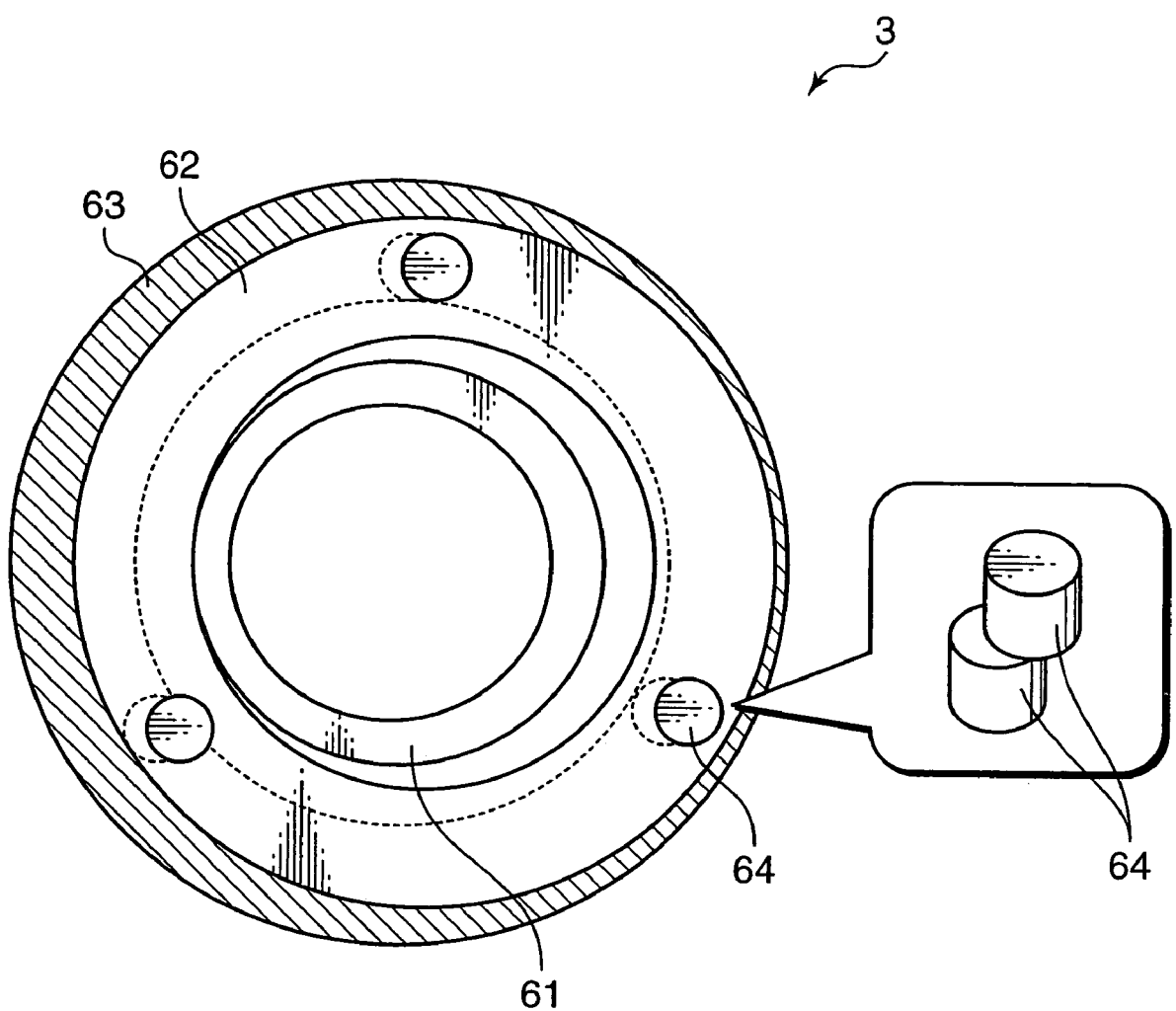
FIG. 14 is a perspective view showing an arrangement of a focus lens drive mechanism in accordance with a fifth embodiment of the invention.

In this section, an arrangement is described, wherein a crank rod is used as an example of the contact retainer described in the fourth embodiment. FIG. 14 is an illustration primarily showing a cylindrical cam, an annular gear, and a base block in a focus unit 3 provided with the crank rod in the fifth embodiment. In this embodiment, a cylindrical cam 61, an annular gear 62, and a base block 63 are provided. The cylindrical cam 61 has a cam surface extending in an optical axis direction of the focus unit 3, and external teeth (not shown) at a radially outer position. The cylindrical cam 61 is rotatably supported about the optical axis. The ring-like annular gear 62 is provided around the outer surface of the cylindrical cam 61. The annular gear 62 has internal teeth, which is interconnected to the external teeth of the cylindrical cam 61 by gear engagement. Axially extending four cylindrical projections (not shown) are circumferentially and substantially equidistantly attached to the annular gear 62 by a certain pitch i.e. by 90°. Four SMA wires (not shown) are fixed on the annular gear 62 in a state that each SMA wire is wound into a substantially L-shape over the corresponding cylindrical projection, with a certain tension force being applied thereto. Substantially middle parts of the respective SMA wires come into contact with the corresponding cylindrical projection. Both ends of each SMA wire are jointed to SMA retaining blocks (not shown) attached to the base block 63, which is fixed to a fixing member (not shown), and is provided around the outer surface of the annular gear 62. In this embodiment, eight SMA retaining blocks are provided. The substantially L-shaped SMA wire is obtained by angularly displacing the SMA wires from each other by 90° about the optical axis. Each SMA retaining block is connected to an unillustrated drive circuit so that a current is selectively supplied to the SMA retaining blocks.

Plural crank rods 64, which are so-called eccentric rods, and serve as eccentric cylindrical projections, e.g. three crank rods 64 as shown in FIG. 13, are received both in the annular gear 62 and in the base block 63. Each crank rod 64 is pivotally supported by the annular gear 62 and the base block 63 for crank rotation. With this arrangement, the annular gear 62 and the base block 63 are eccentrically movable relative to each other. The crank rods 64 singly define the position of the annular gear 62 to the base block 63, and a trajectory of the annular gear 62. Specifically, providing the crank rods 64 enables to retain the position of the annular gear 62 relative to the base block 63 in rotational driving, i.e. allow the arrangement with the crank rods 64 to function as a guide mechanism, and simultaneously enables to retain the contact of the annular gear 62 with the cylindrical cam 61.

When the SMA wire adjacent the site where the cylindrical cam 61 and the annular gear 62 are contacted to each other is energized, the annular gear 62 is moved parallel to the cylindrical cam 61, while contacting the outer surface of the cylindrical cam 61 due to the effect of the crank rods 64. Since the annular gear 62 and the cylindrical cam 61 are interconnected to each other by gear engagement, the cylindrical cam 61 is rotated without sliding over the annular gear 62. This operation is continued until a clearance near a pressing contact site of the energized SMA wire against the corresponding cylindrical projection is gone. Similarly to the above, when the succeeding SMA wire is energized, a movement similar to the movement described above is performed, whereby the cylindrical cam 61 is continuously rotated. The energization approach for the respective SMA wires in the embodiment may be the same as described in the first embodiment referring to FIG. 3.

In the fifth embodiment, the arrangement provided with the position retaining function and the contact retaining function is realized with use of the plural e.g. three crank rods 64. Alternatively, an arrangement similar to the above may be realized with use of a position retainer constituted of a single crank rod and a position retaining guide, for instance.

Sixth Embodiment

Figure 15:
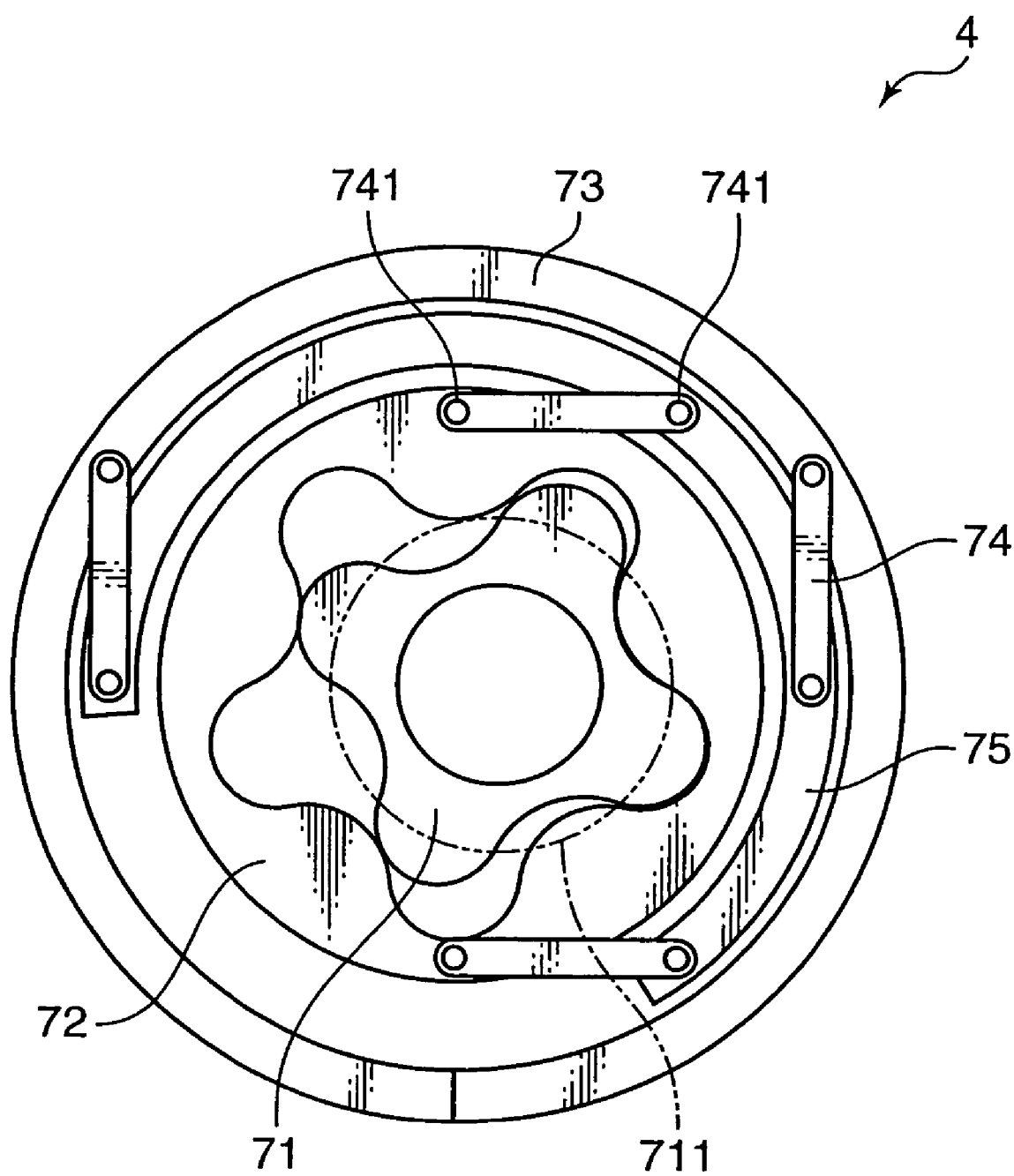
FIG. 15 is a perspective view showing an arrangement of a focus lens drive mechanism in accordance with a sixth embodiment of the invention.

In this section, an arrangement is described, wherein a cycloid gear is used as an example of the contact retainer. FIG. 15 is an illustration primarily showing a cylindrical cam, an annular gear, and a base block in a focus unit 4 provided with the cycloid gear in the sixth embodiment. In this embodiment, a cylindrical cam 71, an annular gear 72, and a base block 73 are provided. The focus unit 4 has a position retaining guide 74 and an intermediate arcuate ring 75. The cylindrical cam 71 has a cam surface extending in an optical axis direction of the focus unit 4, and an external cycloid gear at a radially outer position. The cylindrical cam 71 is rotatably supported about the optical axis. The ring-like annular gear 72 is provided around the outer surface of the cylindrical cam 71. The annular gear 72 has an internal cycloid gear with the tooth number larger than the tooth number of the external cycloid gear of the cylindrical cam 71 by one. The external cycloid gear of the cylindrical cam 71 is interconnected to the internal cycloid gear of the annular gear 72 by gear engagement.

The annular gear 72 has its rotation about the optical axis restrained by the position retaining guide 74. The position retaining guide 74 has e.g. two pairs of parallel link levers serving as linking members, as shown in FIG. 15. One of the parallel link lever pairs is provided between the annular gear 72 and the intermediate arcuate ring 75 partly surrounding the outer circumference of the annular gear 72, and the other one of the parallel link lever pairs is provided between the intermediate arcuate ring 75 and the base block 73 surrounding the outer circumference of the intermediate arcuate ring 75. Both ends 741 of each parallel link lever are attached to the corresponding members i.e. the annular gear 72, the base block 73, or the intermediate arcuate ring 75 by a pivot pin or a like member so that each parallel link lever is pivotally rotatable about the corresponding pivot pin.

Similarly to the fifth embodiment, axially extending four cylindrical projections (not shown) are circumferentially and substantially equidistantly attached to the annular gear 72 by a certain pitch i.e. by 90°. Four SMA wires (not shown) are fixed on the annular gear 72 in a state that each SMA wire is wound into a substantially L-shape over the corresponding cylindrical projection, with a certain tension force being applied thereto. Substantially middle parts of the respective SMA wires come into contact with the corresponding cylindrical projection. Both ends of each SMA wire are jointed to SMA retaining blocks (not shown) attached to the base block 73, which is fixed to a fixing member (not shown), and is provided around the outer surface of the annular gear 72. In this embodiment, eight SMA retaining blocks are provided. The substantially L-shaped SMA wire is obtained by angularly displacing the SMA wires from each other by 90° about the optical axis. Each SMA retaining block is connected to an unillustrated drive circuit so that a current is selectively supplied to the SMA retaining blocks.

Generally, cycloid gears with a tooth number difference of one each has contacts by the number corresponding to the tooth number thereof. The phases of the tooth planes of the respective cycloid gears are displaced from each other at the respective contacts by the angle obtained by dividing 360° by the tooth number. Accordingly, the relative movement of the cycloid gears is singly defined in light of the above phase displacement. Actually, defining at least two positions is sufficient to determine the trajectory of the gear, because rotation of the gear is restrained, namely, the position of the gear is retained. Accordingly, the gears to be used in the embodiment may be cycloid gears with a tooth number difference of one, and constitute so-called unmating gears having a feature that one of the gears has at least two teeth. In this arrangement, since the position of the annular gear 72 is retained by the parallel link lever pairs, the annular gear 72 is moved parallel to the cylindrical cam 71, whereby the cylindrical cam 71 is rotated.

Energizing the SMA wire which is expected to exhibit a maximal force among the SMA wires in a tangential direction at a contact point where a tangential line including a contact point of the cylindrical cam 71 and the annular gear 72 is substantially parallel to a tangential line on an imaginary circle 711 defined by rotation of the cylindrical cam 71 about its rotation axis, enables to move the annular gear 72 parallel to the cylindrical cam 71 while rotating the cylindrical cam 71 due to a relative restraining effect of the cycloid gears with the tooth number difference of one. Similarly to the above, when the succeeding SMA wire is energized, a movement similar to the movement described above is performed, whereby the cylindrical cam 71 is continuously rotated.

The arrangement in the sixth embodiment is advantageous because the contact retainer provided in the fourth and fifth embodiments can be eliminated, thereby enabling to produce a compact and less costly drive mechanism. Also, in the sixth embodiment, since there is no need of energizing two SMA wires adjacent to each other in order to keep the contact of the cylindrical cam with the annular gear, as recited in the third embodiment, the arrangement in the sixth embodiment enables to perform driving at a low power consumption. The energization approach for the respective SMA wires in the sixth embodiment may be the one as recited in the first embodiment described referring to FIG. 3.

To summarize the invention, in the motor of the embodiments corresponding to the zoom unit 1, and the focus units 2, 2', and 4, a rotary member corresponding to the cylindrical cam 14 and the cylindrical cam 54 has a contact portion on the outer periphery thereof, and is rotatably supported on a base block corresponding to the base blocks 16, 16', 57, and 73 for outputting a rotating force. An oscillatory ring, corresponding to the drive gear 21 and the annular gear 55, with a contact portion on the inner periphery thereof, is oscillated on the plane perpendicular to the rotation axis of the rotary member in contact with the contact portion of the rotary member. Also, a position retainer, corresponding to the parallel springs 23 through 26, the position retaining guide 56, the through holes 5521, 5711, the position retaining guide 74, and the like, retains the position of the oscillatory ring. The oscillatory ring is brought into contact with three or more wire- or belt-shaped expandable and contractible actuators, corresponding to the SMA wires 35 through 38, and the SMA wires 58a through 58d, with both ends of the each actuator being fixed to the base block.

With this arrangement, a motor capable of continuously rotating in forward and backward directions is realized by sequentially energizing the actuators for expansion and contraction. Also, this arrangement constitutes a speed reduction mechanism, wherein the rotary member is allowed to rotate merely by the length corresponding to the trajectory of the oscillatory ring. This arrangement enables to generate a force sufficient for drivingly rotating the rotary member even with use of the wire- or belt-shaped expandable and contractible actuators e.g. wire- or belt-shaped expandable and contractible actuators made of a shape metal alloy, for instance. Also, use of the actuators having an elongated shape with a small size in cross section enables to increase the cooling rate and at the same time to secure an output, by utilizing the actuators made of the shape metal alloy having a property that the actuators are contracted as a result of heat generation. This enables to realize a quiet and compact motor capable of generating a large rotational driving force, with use of the shape metal alloy. Also, in this arrangement, all the constituent elements are arranged in close contact with the outer surface of the rotary member. Accordingly, providing an optical system on the rotary member and assembling the optical system including relevant peripheral elements thereof into a concentrically cylindrical configuration, for instance, enables to realize a motor capable of driving a lens element with a substantially coaxial arrangement with the optical system. Since all the constituent elements are arranged around the rotary member, it is possible to mount the wire- or belt-shaped actuators along the outer circumference of the rotary member, which provides an improved assembling.

Also, the contact of the rotary member with the oscillatory ring is retained by a contact retainer corresponding to the magnets 544, 557, the crank rods 64, or an equivalent element. With this arrangement, the oscillatory ring is securely oscillated in contact with the rotary member due to the contact force exerted by the contact retainer to retain the contact of the rotary member with the oscillatory ring, namely, a centripetal force exerted by the oscillatory ring to the rotary member. Specifically, in the case where the rotary member and the oscillatory ring are interconnected to each other by gear engagement using the cycloid gear 542 and the like, collision of tooth tips of the gears is avoided due to a stabilized distance between the center positions of the respective gears, which enables to perform smooth rotational driving i.e. output a rotating force due to stabilized rotation of the rotary member.

Also, the expandable and contractible actuators each is in the form of a thin shape metal alloy wire having a shorter size in cross section of 100 μm or less. This arrangement enables to produce a compact and light-weighted motor, and to increase the cooling rate of the shape metal alloy, in other words, to keep the reactive rate of the shape metal alloy i.e. the expandable and contractible rate of the actuators high.

Also, at least one position retainer is provided between the base block and the oscillatory ring, and a guide member, corresponding to the position retaining guide 56, for slidably moving the base block and the oscillatory ring in directions orthogonal to each other, and receiving portions, corresponding to the through-holes 5521, 5711, in which the guide member is slidably received, constitute a guide mechanism. This enables to realize the position retainer with a simplified arrangement constituted of the guide member and the receiving portions.

Also, as shown in FIG. 13, the contact retainer is constituted of magnets, corresponding to the magnets 544, 577, or the charge retaining members, wherein the magnets are arranged individually on the rotary member corresponding to the cylindrical 54 and the oscillatory ring corresponding to the annular gear 55, or on the rotary member and the base block corresponding to the base block 57, with their polarities opposite to each other between the rotary member and the oscillatory ring, or between the rotary member and the base block, so as to generate a contact force at a contact position of the rotary member and the oscillatory ring where the rotary member and the oscillatory ring come closest to each other. This enables to realize the contact retainer with a simplified arrangement constituted of the magnets or the charge retaining members.

Also, as shown in FIG. 14, at least one contact retainer is provided between the base block corresponding to the base block 63, and the oscillatory ring corresponding to the annular gear 62, and an eccentric drive mechanism is constituted of eccentric rods corresponding to the crank rods 64 and the eccentric cylindrical projections, wherein the base block and the oscillatory ring are eccentrically movable relative to each other. This enables to realize the contact retainer with a simplified arrangement constituted of the eccentric rods, and to allow the contact retainer to function as the position retainer as well.

Also, as shown in FIG. 15, the oscillatory ring corresponding to the annular gear 72 is oscillated in contact with the cycloid gear formed on the outer periphery of the rotary member in a state that the cycloid gear formed on the inner periphery of the oscillatory ring has the tooth number larger than the tooth number of the cycloid gear formed on the outer periphery of the rotary member corresponding to the cylindrical cam 71 by one. This arrangement enables to perform a function of retaining the contact of the rotary member with the oscillatory ring.

Also, as shown in FIG. 15, the contact retainer is constituted of linking members corresponding to the position retaining guide 74 and the parallel linking levers, wherein at least one pair of the linking members is provided each between the oscillatory ring, and an intermediate arcuate ring corresponding to the intermediate arcuate ring 75 partly surrounding the outer circumference of the oscillatory ring, and between the intermediate arcuate ring, and the base block corresponding to the base block 73 surrounding the outer circumference of the intermediate arcuate ring. The linking members in pair are arranged parallel to each other, and both ends of the each linking member are pivotally connected to the oscillatory ring and the intermediate arcuate ring, or to the intermediate arcuate ring and the base block, respectively. This enables to realize the contact retainer with a simplified arrangement constituted of the at least two linking member pairs, with each linking pair having the parallel arrangement, in the arrangement where the oscillatory ring is oscillated in contact with the cycloid gear formed on the outer periphery of the rotary member in a state that the cycloid gear formed on the inner periphery of the oscillatory ring has the tooth number larger than that of the cycloid gear formed on the outer periphery of the rotary member by one.

Also, in the motor device of the embodiments corresponding to the zoom unit 1, and the focus units 2, 2', and 4, a rotary member corresponding to the cylindrical cam 14 and the cylindrical cam 54 has a contact portion on the outer periphery thereof, and is rotatably supported on a base block corresponding to the base blocks 16, 16', 57, and 73 for outputting a rotating force. An oscillatory ring, corresponding to the drive gear 21 and the annular gear 55, with a contact portion on the inner periphery thereof, is oscillated on the plane perpendicular to the rotation axis of the rotary member in contact with the contact portion of the rotary member. Also, a position retainer, corresponding to the parallel springs 23 through 26, the position retaining guide 56, the through holes 5521, 5711, the position retaining guide 74, and the like, retains the position of the oscillatory ring. The oscillatory ring is brought into contact with three or more wire- or belt-shaped expandable and contractible actuators, corresponding to the SMA wires 35 through 38, and the SMA wires 58a through 58d, with both ends of the each actuator being fixed to the base block, and a substantially middle part thereof being in contact with the oscillatory ring. The actuators may be called as energization contractible actuators, for instance, in light of the fact that the actuators are contracted by energization thereto. The actuators adjacent to each other are sequentially energized by an energization controller corresponding to the unillustrated drive circuit connected to the SMA wires 35 through 38 or the SMA wires 58a through 58d.

With this arrangement, a motor device capable of continuously rotating in forward and backward directions is realized by causing the energization controller to sequentially energize the actuators adjacent to each other for contraction. Also, this arrangement constitutes a speed reduction mechanism, wherein the rotary member is allowed to rotate merely by the length corresponding to the trajectory of the oscillatory ring. This arrangement enables to generate a force sufficient for drivingly rotating the rotary member even with use of the wire- or belt-shaped expandable and contractible actuators e.g. wire- or belt-shaped expandable and contractible actuators made of a shape metal alloy, for instance. Also, use of the actuators having an elongated shape with a small size in cross section enables to increase the cooling rate and at the same time to secure an output, by utilizing the actuators made of the shape metal alloy having a property that the shape metal alloy is contracted as a result of heat generation by energization. This enables to realize a quiet and compact motor device capable of generating a large rotational driving force, with use of the shape metal alloy. Also, in this arrangement, all the constituent elements are arranged in close contact with the outer surface of the rotary member. Accordingly, providing an optical system on the rotary member and assembling the optical system including relevant peripheral elements thereof into a concentrically cylindrical configuration, for instance, enables to realize a motor device capable of driving a lens element with a substantially coaxial arrangement with the optical system. Since all the constituent elements are arranged around the rotary member, it is possible to mount the wire- or belt-shaped actuators along the outer circumference of the rotary member, which provides an improved assembling.

Also, the contact of the rotary member with the oscillatory ring is retained by a contact retainer corresponding to the magnets 544, 557, the crank rods 64, or an equivalent element. With this arrangement, the oscillatory ring is securely oscillated in contact with the rotary member due to the contact force exerted by the contact retainer to retain the contact of the rotary member with the oscillatory ring, namely, a centripetal force exerted by the oscillatory ring to the rotary member. Specifically, in the case where the rotary member and the oscillatory ring are interconnected to each other by gear engagement, collision of tooth tips of the gears is avoided due to a stabilized distance between the center positions of the respective gears, which enables to perform smooth rotational driving i.e. output a rotating force due to stabilized rotation of the rotary member.

Also, as shown in FIG. 12, the rotary member corresponding to the cylindrical cam 54*a*, and the oscillatory ring corresponding to the annular gear 55*a* each includes a contact portion having such a shape that the rotary member and the oscillatory ring are interconnectable to each other by a frictional force. This enables to interconnect the rotary member to the oscillatory ring by frictional engagement. Further, as compared with a case where the rotary member and the oscillatory ring are gear-connected, for instance, this arrangement enables to make the gear smaller by a size corresponding to the tooth height, and make the gear arrangement simple, i.e. make the gear processing easy. Also, this arrangement enables to transmit the driving force between the rotary member and the oscillatory ring by way of the frictional engagement i.e. a frictional force, and to provide a function as a torque limiter for limiting a load.

Also, an energization controller, corresponding to the unillustrated drive circuit connected to the SMA wires 35 through 38 or the SMA wires 58*a* to 58*d*, simultaneously energizes adjacent two actuators among the actuators while shifting the actuators for the simultaneous energization one after another. Since the energization control is performed in such a manner that the adjacent two actuators are simultaneously energized while shifting the actuators for the simultaneous energization sequentially, an improved energy saving effect can be obtained, as compared with a case where a single current e.g. a first current is supplied for energization of the actuators, by supply of two different kinds of currents for the simultaneous energization, namely, supply of the first current, corresponding to the heating current Id indicated by the arrow A in FIG. 9, for instance, which is capable of attaining a temperature equal to or larger than a deformation start temperature at which the actuator is started to be deformed, and a second current, corresponding to the retaining current Ih indicated by the arrow B in FIG. 9, which is smaller than the first current, and is capable of retaining substantially the same deformed state as the above deformed state, with use of the hysteresis (see FIG. 9) of the shape metal alloy, in the case where the actuators are made of the shape metal alloy. This enables to realize a motor device having an improved energy efficiency.

Also, energization amounts for energizing the adjacent two actuators respectively are a first energization amount to be obtained by supply of the first current which is capable of attaining the temperature equal to or higher than the deformation start temperature at which the deformation of the actuator is started, and a second energization amount to be obtained by supply of the second current, which is smaller than the first current, and is capable of retaining substantially the same deformed state as the above deformed state. This arrangement enables to provide an improved energy saving effect, as compared with the case where energization is performed merely with supply of a single current e.g. the first current, by the amount corresponding to a difference between the first energization amount and the second energization amount. This enables to realize a motor device having an improved energy efficiency.

Also, a temperature detector corresponding to the temperature sensor detects the temperature relating to the actuators, and an energization controller controls an energization interval and an energization time based on temperature information detected by the temperature detector to sequentially energize the actuators. Thus, the energization control is performed in such a manner that the actuators are sequentially energized, while controlling the energization interval and the energization time based on the temperature information detected by the temperature detector. This enables to provide an improved energy saving effect by extending the energization interval of the respective actuators i.e. shortening the energization time of the respective actuators in the sequential energization, and to stabilize the deformation by shortening the energization interval of the respective actuators i.e. extending the energization time of the respective actuators in the sequential energization in accordance with a temperature rise of the respective actuators. Thereby, a motor device capable of performing optimal drive control depending on the purpose of use can be easily provided.

Also, as shown in FIGS. 10A through 10D, the energization controller controllably extends the energization interval as the temperature of the respective actuators by the energization is raised. This enables to accomplish energy saving in driving of the motor by extending the energization interval of the respective actuators i.e. by shortening the energization time of the respective actuators in the sequential energization, in other words, by performing energization control of delaying the energization start time by a predetermined period in accordance with the temperature rise of the respective actuators.

Also, as shown in FIGS. 11A through 11D, the energization controller controllably shortens the energization interval as the temperature of the respective actuators by the energization is raised. This enables to stabilize the deformation i.e. contraction of the respective actuators by shortening the energization interval of the respective actuators i.e. by extending the energization time of the respective actuators in the sequential energization, in other words, by performing energization control to set the energization start time earlier by a predetermined period in accordance with the temperature rise of the respective actuators.

Also, in the lens drive mechanism of the embodiments corresponding to the focus units 2, 2', and 4, a rotary cylinder i.e. a rotary member, corresponding to the cylindrical cam 54 and the rectilinear guide cylinder 52 has a contact portion on the outer periphery thereof, and is rotatably supported on a base block corresponding to the base block 57 while holding a lens element corresponding to the focus lens element 53 thereon for outputting a rotating force. An oscillatory ring, corresponding to the annular gear 55, with a contact portion on the inner periphery thereof, is oscillated on the plane perpendicular to the rotation axis of the rotary member in contact with the contact portion of the rotary member. Also, a position retainer, corresponding to the position retaining guide 56, the through holes 5521, 5711, and the like, retains the position of the oscillatory ring. The contact of the rotary member with the oscillatory ring is retained by a contact retainer corresponding to the magnets 544, 557, the crank rods 64, and the like. The oscillatory ring is brought into contact with three or more wire- or belt-shaped expandable and contractible actuators, corresponding to the SMA wires 58a through 58d, with both ends of the each actuator being fixed to the base block, and a substantially middle part thereof being in contact with the oscillatory ring.

With this arrangement, a lens drive mechanism capable of continuously rotating the rotary member carrying the lens element in forward and backward directions is realized by sequentially energizing the actuators for expansion and contraction. Also, this arrangement constitutes a speed reduction mechanism, wherein the rotary member is allowed to rotate merely by the length corresponding to the trajectory of the oscillatory ring. This arrangement enables to generate a force sufficient for drivingly rotating the rotary member even with use of the wire- or belt-shaped expandable and contractible actuators e.g. wire- or belt-shaped expandable and contractible actuators made of a shape metal alloy, for instance. Also, use of the actuators having an elongated shape with a small size in cross section enables to increase the cooling rate and at the same time to secure an output, by utilizing the actuators made of the shape metal alloy having a property that the shape metal alloy is contracted as a result of heat generation. This enables to realize a quiet and compact lens drive mechanism capable of generating a large rotational driving force, with use of the shape metal alloy.

Also, with this arrangement, the oscillatory ring is securely oscillated in contact with the rotary member due to the contact force exerted by the contact retainer to retain the contact of the rotary member with the oscillatory ring, namely, a centripetal force exerted by the oscillatory ring to the rotary member. Specifically, in the case where the rotary member and the oscillatory ring are interconnected to each other by gear engagement, collision of tooth tips of the gears is avoided due to a stabilized distance between the center positions of the respective gears, which enables to perform smooth rotational driving i.e. output a rotating force due to stabilized rotation of the rotary member.

Also, in this arrangement, all the constituent elements are arranged in close contact with the outer surface of the rotary member. Accordingly, providing an optical system on the rotary member and assembling the optical system including relevant peripheral elements thereof into a concentrically cylindrical configuration, for instance, enables to realize a lens drive mechanism capable of driving a lens element with a substantially coaxial arrangement with the optical system. Since all the constituent elements are arranged around the rotary member, it is possible to mount the wire- or belt-shaped actuators along the outer circumference of the rotary member, which provides an improved assembling.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A motor comprising:
    a base block;
    a rotary member which is rotatably supported on the base block, and includes a contact portion on an outer periphery thereof for outputting a rotating force;
    an oscillatory ring which includes a contact portion on an inner periphery thereof, and is oscillated on a plane perpendicular to a rotation axis of the rotary member in contact with the contact portion of the rotary member;
    a position retainer for retaining a position of the oscillatory ring; and
    three or more expandable and contractible actuators each in the form of a wire or a belt, the each actuator having both ends thereof being fixed to the base block for contact with the oscillatory ring.

2. The motor according to claim 1, further comprising a contact retainer for retaining the contact of the rotary member with the oscillatory ring.

3. The motor according to claim 1, wherein the expandable and contractible actuators each is made of a shape metal alloy, and has a shorter size in cross section in a direction perpendicular to a longitudinal direction thereof of 100 μm or less.

4. A motor device comprising:
    a motor mechanism including
        a base block,
        a rotary member which is rotatably supported on the base block, and includes a contact portion on an outer periphery thereof for outputting a rotating force,
        an oscillatory ring which includes a contact portion on an inner periphery thereof, and is oscillated on a plane perpendicular to a rotation axis of the rotary member in contact with the contact portion of the rotary member,
        a position retainer for retaining a position of the oscillatory ring, and
        three or more expandable and contractible actuators each in the form of a wire or a belt, the each actuator having both ends thereof being fixed to the base block, and a substantially middle part thereof in contact with the oscillatory ring; and
    an energization controller for sequentially energizing the actuators adjacent to each other.

5. The motor device according to claim 4, further comprising a contact retainer for retaining the contact of the rotary member with the oscillatory ring.

6. The motor device according to claim 4, wherein the rotary member and the oscillatory ring each includes the contact portion having such a shape that the rotary member and the oscillatory ring are interconnectable to each other by a frictional force.

7. A motor comprising:
a base block;
a rotary member which is rotatably supported on the base block, and includes a contact portion on an outer periphery thereof for outputting a rotating force;
an oscillatory ring which includes a contact portion on an inner periphery thereof, and is oscillated on a plane perpendicular to a rotation axis of the rotary member in contact with the contact portion of the rotary member;
a position retainer for retaining a position of the oscillatory ring;
a contact retainer for retaining the contact of the rotary member with the oscillatory ring; and
three or more expandable and contractible actuators each in the form of a wire or a belt, the each actuator having both ends thereof being fixed to the base block and a substantially middle part thereof in contact with the oscillatory ring.

8. The motor according to claim 7, wherein
the position retainer is at least one position retainer provided between the base block and the oscillatory ring, and
the position retainer includes a guide mechanism constituted of a guide member for slidably moving the base block and the oscillatory ring in directions orthogonal to each other, and receiving portions in which the guide member is slidably received.

9. The motor according to claim 7, wherein
the contact retainer includes magnets or charge retaining members which are individually arranged on the rotary member and the oscillatory ring, or on the rotary member and the base block, the magnets having polarities thereof opposite to each other between the rotary member and the oscillatory ring, or between the rotary member and the base block, so as to generate a contact force at a contact position of the rotary member and the oscillatory ring where the rotary member and the oscillatory ring come closest to each other.

10. The motor according to claim 7, wherein
the contact retainer is at least one contact retainer provided between the base block and the oscillatory ring, and
the contact retainer includes an eccentric drive mechanism having eccentric rods each of which is so designed as to eccentrically move the base block and the oscillatory ring relative to each other.

11. A motor device comprising:
a motor mechanism including
a base block,
a rotary member which is rotatably supported on the base block, and includes a contact portion on an outer periphery thereof for outputting a rotating force,
an oscillatory ring which includes a contact portion on an inner periphery thereof, and is oscillated on a plane perpendicular to a rotation axis of the rotary member in contact with the contact portion of the rotary member,
a position retainer for retaining a position of the oscillatory ring, and
three or more expandable and contractible actuators each in the form of a wire or a belt, the each actuator having both ends thereof being fixed to the base block, and a substantially middle part thereof in contact with the oscillatory ring; and
an energization controller for simultaneously energizing two of the actuators adjacent to each other among the actuators while shifting the actuators for the simultaneous energization one after another.

12. The motor device according to claim 11, wherein
energization amounts for energizing the adjacent two actuators respectively are a first energization amount to be obtained by supply of a first current which attains a temperature equal to or higher than a deformation start temperature at which a deformation of the corresponding actuator is started, and a second energization amount to be obtained by supply of a second current which is smaller than the first current, and is capable of retaining substantially the same deformed state as the deformed state of the actuator obtained by the energization thereto by the supply of the first current.

13. A motor device comprising:
a motor mechanism including
a base block,
a rotary member which is rotatably supported on the base block, and includes a contact portion on an outer periphery thereof for outputting a rotating force,
an oscillatory ring which includes a contact portion on an inner periphery thereof, and is oscillated on a plane perpendicular to a rotation axis of the rotary member in contact with the contact portion of the rotary member,
a position retainer for retaining a position of the oscillatory ring, and
three or more expandable and contractible actuators each in the form of a wire or a belt, the each actuator having both ends thereof being fixed to the base block, and a substantially middle part thereof in contact with the oscillatory ring;
a temperature detector for detecting a temperature relating to the respective actuators; and
an energization controller for sequentially energizing the actuators by controlling an energization interval and an energization period based on temperature information detected by the temperature detector.

14. The motor device according to claim 13, wherein
the energization controller controllably extends the energization interval as the temperature of the respective actuators by the energization is raised.

15. The motor device according to claim 13, wherein
the energization controller controllably shortens the energization interval as the temperature of the respective actuators by the energization is raised.

16. A motor comprising:
a base block;
a rotary member which is rotatably supported on the base block, and includes a cycloid gear on an outer periphery thereof for outputting a rotating force;
an oscillatory ring which includes a cycloid gear on an inner periphery thereof, and is oscillated on a plane perpendicular to a rotation axis of the rotary member in contact with the cycloid gear of the rotary member, the cycloid gear of the oscillatory ring having the tooth number larger than the tooth number of the cycloid gear of the rotary member by one,
a position retainer for retaining a position of the oscillatory ring; and
three or more expandable and contractible actuators each in the form of a wire or a belt, the each actuator having both ends thereof being fixed to the base block, and a substantially middle part thereof in contact with the oscillatory ring.

17. The motor according to claim 16, wherein
the position retainer includes at least one pair of linking members each provided between the oscillatory ring and an intermediate arcuate ring partly surrounding an outer circumference of the oscillatory ring, and between the intermediate arcuate ring and the base block surrounding an outer circumference of the intermediate arcuate ring; and
the linking members of the each pair are arranged parallel to each other, and the each linking member has both ends thereof being pivotally connected to the oscillatory ring and the intermediate arcuate ring, or to the intermediate arcuate ring and the base block, respectively.

18. A lens drive mechanism comprising:
a base block:
a rotary cylinder which is rotatably supported on the base block while holding a lens element thereon, and which includes a contact portion on an outer periphery thereof for outputting a rotating force;
an oscillatory ring which includes a contact portion on an inner periphery thereof, and is oscillated on a plane perpendicular to a rotation axis of the rotary cylinder in contact with the contact portion of the rotary cylinder;
a position retainer for retaining a position of the oscillatory ring;
a contact retainer for retaining the contact of the rotary cylinder with the oscillatory ring; and
three or more expandable and contractible actuators each in the form of a wire or a belt, the each actuator having both ends thereof being fixed to the base block, and a substantially middle part thereof in contact with the oscillatory ring.

* * * * *